United States Patent
Mandler et al.

(10) Patent No.: US 7,413,502 B2
(45) Date of Patent: Aug. 19, 2008

(54) METHOD FOR PRODUCING OPHTHALMIC LENSES AND OTHER SHAPED BODIES WITH OPTICALLY ACTIVE SURFACES

(75) Inventors: Roland Mandler, Heuchelheim (DE); Reinhold Weis, Rainau-Dalkingen (DE)

(73) Assignees: Optotech Optikmaschinen GmbH, Wettenberg (DE); Carl Zeiss Vision GmbH, Aalen (DE)

( * ) Notice: Subject to any disclaimer, the term of this patent is extended or adjusted under 35 U.S.C. 154(b) by 116 days.

(21) Appl. No.: 11/222,790

(22) Filed: Sep. 12, 2005

(65) Prior Publication Data

US 2006/0073771 A1    Apr. 6, 2006

Related U.S. Application Data

(63) Continuation of application No. PCT/EP2004/002515, filed on Mar. 11, 2004.

(30) Foreign Application Priority Data

| Mar. 11, 2003 | (DE) | ................. 103 10 561 |
| Apr. 2, 2003 | (DE) | ................. 103 15 008 |
| Apr. 24, 2003 | (DE) | ............... 103 18 597.6 |
| Jul. 18, 2003 | (DE) | ............... 103 32 673.1 |

(51) Int. Cl.
*B24B 1/00* (2006.01)

(52) U.S. Cl. .................. 451/42; 451/323; 451/390

(58) Field of Classification Search .............. 451/5, 451/41, 140, 255, 42, 43, 323, 325, 390
See application file for complete search history.

(56) References Cited

U.S. PATENT DOCUMENTS 4,733,502 A * 3/1988 Braun .................. 451/42
6,227,952 B1 * 5/2001 Diehl et al. ............. 451/140

FOREIGN PATENT DOCUMENTS

| DE | 40 03 002 | 5/1991 |
| DE | 100 36 158 | 5/2002 |
| EP | 0 896 875 | 2/1999 |
| WO | WO 02/37168 | 5/2002 |

* cited by examiner

*Primary Examiner*—Jacob K. Ackun, Jr.
(74) *Attorney, Agent, or Firm*—Clark & Brody

(57) ABSTRACT

The invention concerns a method for producing ophthalmic lenses that uses plastic blanks in the form of flat, round discs. The outer edge of said plastic blanks is clamped and the desired final surface geometry and surface quality of the front faces of the lens are subsequently produced by a machining process using grinders and/or lathes and by smoothing and polishing processes. During machining, a thicker annular region is retained on the outer circumference of the workpiece. The annular region clamps or arranges the workpiece during machining and transport operations and stabilizes the lens for additional machining. Shaped pieces for identifying the machining axes are attached to the annular region. The lens is provided with fine markings to characterize the lens that has been produced, with the lens then being separated from the region.

17 Claims, 15 Drawing Sheets

METHOD FOR PRODUCING OPHTHALMIC LENSES AND OTHER SHAPED BODIES WITH OPTICALLY ACTIVE SURFACES

CROSS-REFERENCE TO RELATED APPLICATIONS

This application is a continuation of International Patent Application No. PCT/EP2004/002515, filed Mar. 11, 2004. This PCT application was not in English as published under PCT Article 21(2).

FIELD OF THE INVENTION

The invention relates to a method and a device for producing ophthalmic lenses and other shaped bodies with optically active surfaces.

BACKGROUND OF THE INVENTION

Ophthalmic lenses are generally made of plastics which have a high refractive index while presenting a low specific gravity and a good machinability. However, this method may also be used for producing ophthalmic lenses from silicate glass. Machining is usually done by chip removing processes on millers, lathes, grinders and polishing machines.

To simplify the language, "ophthalmic lenses and other shaped bodies" will hereinafter only be referred to as "ophthalmic lenses". It is understood, however, that this always also includes other comparable shaped bodies with similar features. Although the present document hereinafter only refers to ophthalmic lenses made from plastic, this always also encompasses ophthalmic lenses made from silicate glass or mineral glass.

The methods for producing modern ophthalmic lenses have to meet, among others, the following requirements:

A so-called thickness optimization must be possible to minimise the weight of the ophthalmic lenses, thus increasing the wearing comfort. To this end, the shape and the size of the eyeglass frame must be known. This applies both for the contour line of the eyeglass frame and its width. The contour line of the eyeglass frame which is mentally projected onto the workpiece is hereinafter referred to as "virtual contour line".

In the case of plus lenses (center of lens thicker than lens edge) and of neutral lenses (center of lens as thick as lens edge), thickness optimization aims at reducing the thickness of the lenses to the maximum extent possible, given the remaining edge thickness along the virtual contour line (=thickness at circumferential edge of finished ophthalmic lens). The edge thickness must be taken into in account to permit proper mounting of the lens into the eyeglass frame, i. e. the edge thickness must approximately correspond to the width of the border of the eyeglass frame.

In the case of minus lenses (center of lens thinner than lens edge), thickness optimization aims at reducing the thickness of the lenses to the maximum extent possible, given the remaining edge thickness in the center of the lens. A certain minimum thickness in the center of the lens is required to assure the mechanical stability of the ophthalmic lens.

The following description of the method according to the invention substantially refers to plus lenses, since the latter make the advantages of the method particularly apparent. Likewise, however, the method is also applicable to neutral lenses and minus lenses.

Since the two optically active surfaces of plus lenses (front face and rear face) are not plane-parallel to each other but locally have different angles relative to each other, the size of the ophthalmic lens is of great importance for thickness optimization. This is why the shape and the size of the eyeglass frame must be known prior to thickness optimization. Based on a predefined thickness on the edge (eyeglass frame), the larger thickness in the center of the lens is determined.

The manufacture of ophthalmic lenses with due consideration of the aforementioned requirements (thickness optimization) gives rise to the following problems:

1. According to the prior art, particularly great effort is required to be able to clamp the ophthalmic lenses during the manufacturing processes (surface machining and edge machining) in order to perform the respective processing steps, since surface machining involves cuts on the peripheral area and also the edge needs to be processed in addition.

For this reason the edge is only suitable to be used as clamping surface if special procedures are applied. Once the edge has been processed, ophthalmic lenses no longer have a circular circumference but are adapted to the respective shapes and sizes of the eyeglass frames (either exactly or with an allowance for the further processing by the optician).

Since nearly any shape and any size desired are possible, the need emerged to develop special clamping and manufacturing methods.

2. Due to the thickness optimization (ophthalmic lens as thin as possible) and the plastics used as material for the lenses (relatively poor rigidity), the ophthalmic lenses being produced become more and more instable during the machining. The thinner they get by material removal, the more they lose stability and yield under pressure of processing tools, resulting in undesired alterations of the surface geometry. Also in this regard, methods had to be found to overcome the instability mentioned.

3. If the outer circumference of the lens already corresponds to the final ophthalmic lens plus a small allowance of 1 to 2 mm, the lens must naturally be smoothed and polished right up to the edge. For economical reasons, however, conventional tools cannot be used to smooth and polish exactly to the edge.

Therefore, the tools overtravel the edge of the ophthalmic lens during the processing. This results in an undesired large material removal due to the edge pressure in the peripheral area, so that the previously generated precise lens geometry partly gets lost again. Such levelling of the lens geometry in the peripheral area is an important disadvantage.

Various methods for avoiding the specified problems as well as devices for executing such methods are known.

DE-A1-40 03 002, for example, describes a method for producing ophthalmic lenses which includes the blocking of the lenses prior to their processing. This means that the cast or compression molded plastic blank is fixed to a so-called block with a Wood's metal. On the one hand, the block is adapted to be easily fixed to the workpiece spindles of the processing devices, and on the other hand, it has structures which assure a good adhesion of the Wood's metal.

The plastic blanks which are preferably used have one face (preferably the convex front face) which is being finished already during the casting or compression molding process. This means that the surface geometry and the surface quality already match the final requirements and will not be changed anymore. Typically, the surface geometry is bifocal with sliding transitions (progressive). This face will be blocked so that the concave rear face (unprocessed) and the circumference can be processed.

However, since the blank has one face finished which needs no further processing, one blocking operation will be sufficient. After blocking, the lens can be clamped to the workpiece spindle of the processing device. The connection with the Wood's metal (support function) also provides the mechanical stability required for the subsequent processing operations.

The method as proposed in DE-A1-40 03 002 presents a number of important disadvantages:

The blocking with Wood's metal is a complex and costly work step. It is suitable for automatic manufacturing processes to a limited extent only.

The Wood's metal contains noxious components (e. g. 12.5% cadmium) und thus requires compliance with special protection measures during processing.

Blocking and deblocking results in a loss of metal of about 10%. With an annual production output worldwide of several hundred million ophthalmic lenses, this is not only a significant cost factor but also an important environmental problem.

Since it is desirable for cost reasons to perform only one blocking operation, one face of the ophthalmic lens already has to be formed integral with the plastic blank (preferably the outer curve) by the preceding casting or compression molding operation. Consequently, a great number of semi-finished plastic blanks has to be kept on stock. For the bifocal ophthalmic lenses alone, the following calculation can be made:

9 different outer curves, 11 different near portion combinations, 3 to 4 different indices of refraction and 3 to 4 different designs (dependent on the shape of the eyeglasses), and all specified parameters both for the right ophthalmic lens and for the left ophthalmic lens result in not less than 3,000 different semi-finished plastic blanks, for example. Assuming 2 to 3 months of inventory, the stock would amount to about 500,000 parts. Since the average price for the semi-finished plastic blanks is 13 Euro per pair, the stock value would amount to more than 3 million Euro. The costs for such a stock are very high and raise expenses for the described method considerably.

A further disadvantage consists in that it is not possible to produce so-called prescription lenses. This means lenses exactly adapted to the eye defect which is to be corrected, as described by the ophthalmologist's prescription.

Due to the fact that with the method mentioned, one face of the plastic blank is already finished, the outer curves and the near portion combinations must be rather roughly graduated (for example in steps of ¼ dioptre) to avoid further stock increase. Within the scope of the given dioptre steps, therefore, the optician can only select an ophthalmic lens as close to the prescription as possible.

Likewise, high cost is caused by the great number of different masks which have to be kept in stock for the coating.

Another method is proposed in DE-C1-100 36 158. In fact, that method does not include blocking, but the lenses have to be cut in the course of the processing and then joined again by welding.

Here, too, the same problems arise with regard to the thickness optimization as described above (the lens has to be clamped and mechanically stabilised). The method involves the use of plastic blanks in the form of round flat discs whose diameter is sensibly larger than that of the ophthalmic lenses to be produced. The plastic blanks may be completely unprocessed or roughly preformed. In principle, semi-finished plastic blanks could also be used. However, this would also entrain the disadvantages that an important stock is required and that it is not possible to produce prescription lenses.

Even though the method disclosed in DE-C1-100 36 158 avoids some of the disadvantages of the method which is proposed by DE-A1-40 03 002, it presents some other disadvantages:

Cutting out the semi-finished lens from the outer edge with axial displacement and subsequent joining of the two parts by welding requires a complex special machine with laser devices which is accordingly expensive.

Furthermore, the costs of the manufacturing method considerably increase by the additional work steps on the special machine.

The cutting out and the laser-welding of the two parts produce important and lasting thermal stress in the finished lenses, since they are performed twice. However, many of the plastic materials used are very sensitive to thermal stress and respond after some time by crack formation in the peripheral area. This is not acceptable and presents an important disadvantage of the method.

It is impossible to cut out the semi-finished lens by means of mechanical tools (to avoid thermal stress) since the gap generated thereby would be too large, and the lens could not be joined anymore with the peripheral ring in a perfectly fitting manner.

It is an object of the invention to overcome these and further drawbacks found in the prior art and to develop a method and a device which allow for the manufacture of ophthalmic lenses in accordance with the requirements set forth below.

1. If possible, blocking should be avoided.
2. The method must be suitable to be automated.
3. The manufacture of the ophthalmic lenses must be cost-efficient.
4. It must be possible to produce prescription lenses (exact compliance of the ophthalmic lens with the given prescription, no dioptre steps).
5. No individual masks are required for the coating.
6. The number of plastic blanks in stock should be as small as possible.
7. No expensive special machines are required.
8. Thermal stress in the ophthalmic lenses is avoided.

Main features of the invention are specified in the characterizing portion of the claims. Advantageous embodiments will become apparent from the distinguishing characteristics of the dependent claims.

The method according to the invention involves the use of plastic blanks in the form of flat round discs (having a thickness which is smaller than the diameter) as raw material for producing ophthalmic lenses. The two faces (front face and rear face) may have any shape desired. The diameter of the plastic blanks is selected so as to be 5 to 7 mm larger than the typical diameter of the methods of the prior art. As a result, some more material will be needed. However, considering the method and its advantages as a whole, the increased material consumption is negligible.

So-called raw parts having plane faces or preformed structures on one or both sides are used as plastic blanks. If applicable, such preformed structures are formed integral with the plastic blanks during the casting or compression molding of the latter. In this case, no finished surfaces with optical qualities are present.

It is an important basic principle of the method according to the invention that the plastic blanks are circumferentially clamped (externally or internally) during all processing steps and that the machining is carried out in such manner that an annular circumferential region is retained whose thickness approximately corresponds to that of the plastic blank.

The following description always refers to externally clamping tools. It is also possible, however, to use internally clamping tools. When clamping a workpiece by means of internally clamping tools, the clamping elements move from the inside towards the outside and engage a border (edge) of the plastic blank which in such case has to be shaped accordingly.

Only after completion of all work steps (milling, turning, smoothing, polishing if applicable, marking and coating), the actual ophthalmic lens is separated from the outer annular region. This may be done mechanically, for example by means of milling cutters.

This manufacturing method is very advantageously applicable to any type of lenses (plus, minus and neutral lenses). The method is particularly advantageous in the case of plus lenses and neutral lenses where due to their thin edge, it is particularly difficult to clamp the workpiece and to achieve a good stability.

Minus lenses, by contrast, have a thicker edge. But here, too, important advantages can be achieved by retaining the outer annular region for clamping purposes.

This method for producing ophthalmic lenses is possible because the diameter of the plastic blanks is slightly larger than in the prior art, and because manufacturing devices are used which allow the generation of the desired geometry on the surface of the ophthalmic lens without cutting the annular circumferential region of the workpiece.

To further simplify the language, the plastic blanks already worked on are hereinafter referred to as workpieces.

Given that the specified annular circumferential region of the workpiece is retained with approximately the full thickness of the plastic blank, ideal clamping surfaces are provided throughout the whole processing process. Furthermore, the workpiece may be put down on the annular region. The existence of these clamping and supporting surfaces of always uniform size and shape is an important advantage for all further processing and transport operations because it allows for stereotyping (standardization) of the tools and devices, and thus leads to important cost savings.

Due to its large thickness and also due to its annular shape, the annular region presents a high mechanical stability and is suitable to support the ophthalmic lens which is firmly connected to it in its inner region. Thus the ophthalmic lens attains the mechanical stability required for the further processing. Naturally, this applies in particular for the peripheral region of the ophthalmic lens.

To generate the desired surface geometry, according to the invention, the mechanical processing is performed on special milling/turning machines which permit both the generation of the rough contour of the lens face that is being processed by milling and the subsequent smoothing of the surface by turning. This results in the very important advantage that the high machining efficiency of the milling operation can be combined with the smoothing effects achieved by turning. Alternatively, however, it is also possible to produce the surface geometry exclusively by milling.

Prior to processing the front face and/or the rear face of the plastic blank, the latter is provided with two opposing circumferential flattenings (similar to key-type flats) or a larger slot or notch for clamping and for defining the axial position of the first processed face (preferably the concave rear face).

In addition, a smaller slot or notch is milled into the circular circumference of the workpiece, close to the one key-type flat and the larger slot or notch, respectively. Said smaller slot or notch is circumferentially arranged, offset by some angular degrees (e. g. 60°) relative to the one flat and the larger slot, respectively, and it is used for indexing (marking) at the second face of the ophthalmic lens (preferably the convex front face).

The indexing serves to define the right and the left ophthalmic lens and prevents erroneous rotations of 180° of the workpiece during further processing.

To simplify the language, reference is hereinafter only made to these flattenings. However, this always also encompasses embodiments which have slots or notches instead of flattenings.

To mill the two flattenings, the plastic blank is clamped onto the aforementioned milling/turning machine. As the blank edge must be processed, the edge of the clamping tool (e. g. collet) is also provided with flattenings which are slightly more pronounced than the flattenings of the workpiece to assure its accessibility while clamped at its edge for processing without the milling cutter contacting the clamping tool.

For milling the indexing portion, the workpiece remains circumferentially clamped so that here, too, the clamping tool provides free access to the respective working area.

Advantageously, the two flattenings and the indexing as well as the first face of the ophthalmic lens are produced, as described, in a single set-up. However, if certain advantages can be obtained, the workpiece may be reclamped to carry out the specified work steps.

It is also possible to produce the flattenings and/or the indexing in combination with other preceding operations (e. g. casting or compression molding of the semi-finished parts).

To define the position, markings and geometrical shapes others than the flattenings, slots and indices may be provided on the circumference of the workpiece or at the annular region or at the front or rear face of the plastic blank. In this respect, the aforementioned features are only exemplary representations of preferred embodiments.

Once the two flattenings, the indexing and the first face of the lens (milling and turning preferably performed at a single set-up) have been processed, the second optically active surface of the workpiece is processed on the milling/turning machine.

To perform the milling and turning operations for producing the desired geometry, the workpiece is turned over and circumferentially clamped in a second clamping tool, with the two flattenings and the indexing serving to fix the workpiece in the correct position.

The clamping tool has two shaped parts which engage the flattenings and a bolt which is encompassed by the indexing to assure an always correct position of the workpiece.

The phase difference (angle of rotation) between the clamping tool and the workpiece spindle is programmed in the control system of the machine. On the clamping tool itself, the phase difference is defined by the two flattenings and the bolt for the indexing.

The processing of the two lens surfaces preferably starts with the concave rear face of the lens, provided that it does not exist yet on the plastic blank (semi-finished part).

To process the optically active surfaces of the lenses, the milling/turning machines according to the invention comprise in their lower area a vertically arranged workpiece spindle which is adapted for rotating drive (C-axis) in a speed and phase controlled manner and which comprises a clamping tool on its upper end to receive the workpiece.

Simultaneously, the workpiece spindle is axially moveable along the Z axis (advance movement). This is necessary because the surface geometries of the ophthalmic lenses which are to be produced are generally not rotationally symmetrical, so that the workpiece spindle has to follow spatial curves on each processing circle. Alternatively it is conceivable to perform the processing on machines with a horizontal arranged workpiece spindle.

In their upper area, the milling/turning machines comprise a tool spindle which is also adapted to be rotatorily driven (B axis) in a speed and phase controlled manner. The tool spindle carries at its front end a tool storage for the lathe tools and at some distance thereto, the milling tool on a coaxial shaft.

The milling tool is of the plain milling cutter type having a large radius (vertical to the axis of rotation) and a smaller width (in the direction of the axis of rotation). The plain milling cutter comprises circumferentially arranged semicircular cutting blades of small radius. Alternatively, spherical cutters may be used instead of the narrow plain milling cutter of large diameter and small thickness.

Preferably, the radius of the lathe tools may have a dimension similar to that of the cutting blades of the plain milling cutter.

It is also contemplated to use the e.g. annular blades of the plain milling cutter as lathe tools. In that case, there is no need for a separate lathe tool. The blades of the tool have then the same angular position relative to the workpiece during both milling and turning. However, angle tracking movements such as described later for the special lathe tools are here not possible.

The tool spindle which is rotatorily driven in the B axis in a controlled manner is mounted to a tool carrieage adapted to be shifted along the X axis and, as a special feature, also along the Y axis.

During the processing operation with the milling cutter which rotates around the B axis, the tool spindle is moved in the Y axis (feed movements), while the workpiece rotates around the C axis in a speed and phase controlled manner and oscillates in the direction of the Z axis. Such oscillations depend on the speed and the phase position of the workpiece in the C axis as well as on the position of the milling cutter in the Y-axis. To this end, the Y axis as well as the Z axis and the C axis are electrically connected to one another in the control system of the machine.

The desired surface geometry is generated by cooperation of the advance of the milling cutter in the Y axis and the movements of the workpiece in the Z axis and in the C axis.

After completion of the milling operation (the milling cutter has reached the center of the ophthalmic lens), the tool spindle and the workpiece spindle are moved in such manner that one of the lathe tools on the tool storage engages the workpiece.

Given that the blades of the milling cutter and the lathe tools are arranged at an angle of 90° relative to each other, the starting position of the lathe tool on the workpiece is also offset by 90° relative to the starting position of the milling tool.

According to the invention, various cutting plates made from different material and/or having different dimensions, cutting radii and clearance angles may be mounted to the tool storage for the lathe tools. Thus it is possible to use the tool storage in cooperation with the B axis as a tool changer by moving the tool presently required into the bottom position, i.e. the operating position, by a short rotary movement of the B axis.

Dependent on the position of the blade in the direction of the X axis, the lathe tool on the workpiece spindle is then moved over the workpiece towards its center (feed movement), with the workpiece spindle together with the workpiece rotating again around the C axis in a speed and phase controlled manner and oscillating in the direction of the Z axis in a controlled manner (advance movement).

During the turning operation in the B-axis, the workpiece spindle with the lathe tool may perform little rotary movements (angle tracking movements) with the result that the main axis of the lathe tool is always positioned at the same given angle (e. g. at right angle) relative to the surface of the workpiece when tracking the geometry of the lens.

This is particularly advantageous in the case of a non-circular lathe tool blade, e. g. in the case of a diamond blade.

The X axis and the Z axis as well as the B axis and the C axis are electrically connected to one another in the control system of the machine so that the given geometry can be generated. With certain lathe tools, however, it is possible to work with the tool spindle locked. In that case, the B axis is no longer connected to the other axes.

By cooperation of the advance of the lathe tool along the X axis and the movements of the workpiece in the Z and C axes as well as by the angle tracking movement of the lathe tool in the B axis, the fine region geometry of the ophthalmic lens, which has been previously generated by milling, is tracked and optimized. The roughness depth thus generated on the surface is very small. Once the lathe tool has reached the center of the workpiece, the operating step turning is completed.

When the annular blades of the plain milling cutter are used as lathe tool, one of these blades is brought into its operating position by turning the tool spindle in the B axis. The turning operation itself is then carried out with the tool spindle locked in the B axis which in that case performs feed movements in the Y axis according to the configuration of the cutting tool.

Here, too, the workpiece performs controlled movements along the C and Z axes. With the specified mode of operation using the milling blades, the Y axis as well as the Z axis and the C axis are connected to one another.

In principle it is also possible to omit the turning step provided that after completion of the milling operation, the surface quality reached is already sufficient for economical processing by smoothing and polishing.

In principle, the operating steps milling and turning may alternatively be performed with other axis combinations on the processing machine.

Once the milling and turning processes are completed, the workpieces are removed and reclamped on subsequent machines for smoothing and polishing, with the outer annular region being used again for clamping. The two flattenings and the indexing assure the correct positioning of the workpiece in the clamping tool.

The smoothing and polishing operations are carried out by forming tools, in particular also by flexible tools, which are covered with grinding pads or polishing foil. The forming tools have to represent an exact impression of the surface of the lens. Consequently, there would be a relatively large stock of expensive forming tools if no flexible tools are used as herein proposed (see DE-A1-101 06 007).

These flexible tools are adapted to be pressed with their working surface against the surface of the lens so as to adopt the geometrical shape of the surface or the lens. In the subsequent operating step, said shape is fixed whereby a forming tool is produced which is true to dimension. The fixation can be undone so that practically any number of duplicating operations is possible.

Smoothing or polishing with the flexible forming tools is very cost-efficient because on the one hand, there is no need for a large stock with expensive forming tools, and on the other hand, there is no need for extensive logistics effort. Such effort, however, would be required when using conventional forming tools because each of the forming tools would have be assigned to the given lens geometry, i.e. a systematic access to a large stock of forming tools would be necessary.

The polishing operation may be omitted with certain coating procedures if the surface which has been produced by smoothing presents a sufficiently small roughness depth. Still existing irregularities are covered when a coating is applied.

The basic sequence of manufacturing steps (both faces without processed surfaces) is as follows:

1. The plastic blank is circumferentially clamped to the workpiece spindle (C/Z axis) of the milling/turning machine by means of a clamping tool (collet) and provided with the two flattenings and the indexing.

Certain operations also provide flattening the surface of the plastic blank (rear face of the lens). Thus a good workpiece support is generated which may be used for processing the front face of the lens and for an exact definition of the position (height, distance) of the geometries on the front and rear faces of the lens.

2. Next, preferably the concave rear face of the lens is processed with the same clamping set-up. In order to perform milling and turning operations for producing the desired geometry in compliance with the prescription, the workpiece remains circumferentially clamped in the clamping tool. The milling and turning operations are carried out as described above.

When the surface geometry is produced on the rear face of the lens, there is no problem with regard to cutting the outer annular region. This is due to the concave shape of the rear face of the lens and the relatively flat curvature of ophthalmic lenses. Therefore, relatively big ophthalmic lenses may be processed without the tools cutting the annular region. In this respect, the slightly increased outer diameter of the plastic blank is also advantageous.

3. Once the given surface geometry on the rear face of the lens has been produced, the latter is smoothed and, if necessary, polished, preferably using flexible forming tools as described above.

4. To protect the completely processed surface, it is cleaned (e. g. by ultrasound) and then covered with a protective lacquer or a foil.

5. Then the workpiece is turned over and reclamped on the milling/turning machine in order to mill the convex front face of the lens. Here again, the outer circumference of the peripheral region is used to clamp the workpiece, with the flattenings assuring secure mounting and the indexing providing for accurate positioning. The rough contour is generated by milling which is followed by a turning operation to smooth the surface of the lens. Both work steps are performed as already described and produce the desired surface geometry according to the prescription (prescription lenses).

Since the milling cutter must penetrate deep into the material in the peripheral region of the workpiece when the convex front face of the lens is processed, the outer annular region of the workpiece which serves for clamping would be eliminated by milling or the milling cutter would collide with the clamping tool.

This is particularly true with regard to the thickness optimization in the case of plus lenses and neutral lenses.

In order to retain the outer annular region during the further processing with approximately full thickness for clamping the workpiece and stabilising the actual ophthalmic lens in the inner region, an annular groove is milled into the edge of the workpiece at the beginning of the milling process.

Said groove is arranged and dimensioned in such manner that on the one hand, the annular region in the peripheral region of the workpiece is retained, and on the other hand the desired thickness on the edge of the actual ophthalmic lens is achieved in the inner region (by performing a thickness optimization).

Due to the shape of the milling tool, the groove is provided with a cross-sectional radius (as seen in a cross-section of the workpiece) which corresponds at least to the radius of the blades of the milling tool. Since said groove is outside the actual active surface, i.e. outside the ophthalmic lens, it is convenient to select the specified radius as small as possible to avoid unneeded removal or loss of material.

This also gives rise to the demand for a plain milling cutter of small thickness and a small radius on the cutting blades. In that case, the outer diameter of the plastic blank may be reduced to a minimum.

Said groove presents the transition between the actual ophthalmic lens and the outer annular region and allows, due to its shape, on the hand for the small thickness on the edge of the actual ophthalmic lens, and on the other hand for the large thickness in the annular region.

The milling operation which is performed to produce the geometry at the front face of the lens involves that the workpiece together with the workpiece spindle rotates around the C axis (speed and phase controlled) while it simultaneously performs quick translatory movements (oscillations) along the Z axis which serve as advance movements.

Simultaneously, the plain milling cutter together with the tool spindle is moved in the Y axis in a controlled manner (feed movements), rotating at constant speed (not controlled) around the B axis of the workpiece. The Y, Z and C axes are connected to one another in the control system of the machine in such manner that the addition of their movements initially produces the specified groove, and subsequently the surface geometry of the front face of the lens.

6. The milling of the front face of the lens is followed by a turning operation in the fine region which step substantially serves to perform small corrections of the geometry and particularly to improve the roughness depth.

Before the start of operations, the circular lathe tool enters the specified annular groove whose radius approximately corresponds to the radius of the tool. This is done by moving the X, Y, Z and B axes. The entrance is offset by 90° relative to that of the milling cutter on the contour of the workpiece, according to the position of the lathe tools on the corresponding tool storage. The turning operation is then carried out as described above under 5. with reference to the milling operation.

If the blades of the milling tool are used as lathe tool, the turning operation is performed in a manner similar to the milling operation. In that case, however, the tool spindle with the tool is fixed in the B axis once one of the blades of the milling tool has been brought into its operating position by little movements in the B axis. As with the milling process, the feed movement is made along the Y axis.

7. Once the given surface geometry on the front face of the lens has been produced, it is smoothed and, if necessary, polished on subsequent machines (smoothing and polishing machines). Here, too, it is preferred to use flexible forming tools. Again, the workpiece is clamped on its outer annular region.

8. The specified mechanical processing operations are followed by a further cleaning step. Again, the standardized shape of the workpiece with identical outer diameters (due to the outer annular region) is very helpful because the supports (washing frame) may be of very simple design and in particular an all-purpose-type. The uniform size of these washing frames allows for considerable cost savings. Subsequently, an engraving is made in the peripheral region of the lens front face which for each ophthalmic lens identifies the position of the near portion and the axial position as specified in the prescription. If applicable, it also contains the logo of the manufacturer.

9. This is followed by the coating of the workpiece, i. e. the application of thin layers to improve the usage properties on both faces. The outer annular region is again an important advantage, since the workpiece may be clamped to it or arranged on it during the coating process. The plurality of support systems and masks which were previously required is reduced to only one size by the standardized diameter of the annular region.

Furthermore it is provided to harden both the first and second faces of the ophthalmic lens in one single work step, using an automatic pivoting device. These are a further cost-saving procedure and device, which are only possible because of the uniform size and shape of the workpieces.

10. In order to separate the ophthalmic lens and the annular region, the workpiece is clamped with its annular region onto a milling machine, and the ophthalmic lens is cut out from the annular region by a suitable milling cutter (e. g. an end mill cutter of small diameter).

It is, however, possible to use other processing procedures to separate the ophthalmic lens from the annular region. The so-called waterjet cutting technology, for example, may here be considered which involves the use of a very fine waterjet at high speed.

By cutting out the ophthalmic lens from the annular region, an optimized outer contour of the ophthalmic lens is preferably generated which substantially corresponds to the selected eyeglass frame, that is to say which includes only a very small allowance. The subsequent grinding into the eyeglass frame minimises therefore the efforts by the optician.

After the final cleaning, the ophthalmic lens is ready for shipment.

To summarise, the method according to the invention has the following advantages:

No block is required for the manufacture. Thus all the disadvantages associated with blocking are avoided.

No expensive special machines with laser devices are required. Thermal stress induced by thermal cutting or welding is avoided.

It is possible to produce prescription lenses.

Due to the special geometry on one face of the lens (preferably the front face), semi-finished plastic blanks (semi-finished parts) with rough dioptre graduation may be used, even if prescription lenses are to be produced. As a result, the manufacturing costs (only one face to be processed) and the storage costs (few semi-finished parts because of rough graduation) are minimised.

The milling/turning machine which is proposed for the execution of the method can be derived on the basis of mechanical engineering by further development as known in the industry of optical machines.

The method is capable of being automated since there are no work steps required (e. g. blocking) which require manual intervention.

Compared to the prior art, the method allows for the production of ophthalmic lenses of sensibly improved quality and optimized thickness. As a result, the visual acuity and the tolerance for the eye-glass wearer are improved.

The method is very cost-efficient since it requires sensibly less work steps than the conventional methods.

Further, less support tools and devices are required since the workpieces can be clamped to or arranged on the standardized diameter of the annular region.

Another embodiment of the method according to the invention for which independent protection is claimed, provides the use of semi-finished parts made by chipless forming as blanks. Semi-finished parts made of plastic, molded by casting or injection molding, are preferred. However, compression molding processes and semi-finished parts of mineral glass are also contemplated.

Here, the concave rear face of the lens already presents optical quality produced by chipless forming and its surface is spherical or aspherical and toric or atoric, respectively. In principle, however, other surface shapes are possible, too.

It is important In the case of material-optimized semi-finished parts that they have a shaped edge in the peripheral area of he concave rear face of the lens (with optical active surface) which is formed integral with the semi-finished part during the manufacture of the latter by chipless forming. Said shaped edge sensibly protrudes over the concave rear face of the lens. In the following processing steps, said shaped edge serves as a clamping surface, just as the "outer annular region" described above. The latter was there produced on the convex front face of the lens by mechanical processing.

Owing to the existence of the shaped edge on the concave rear face of the lens as clamping surface, the generation of an annular region by mechanical processing on the lens front face is rendered superfluous here. The manufacturing costs are therefore reduced.

Due to the fact that, with the method according to the invention, the shaped edge is provided on the concave rear face of the semi-finished part and the latter is clamped with it in the respective processing machine, the lens front face can be freely processed without the presence of a hindering edge. This is an important advantage.

Considerable cost-savings can be achieved, particularly with the smoothing and polishing processes, as it is possible to use more efficient tools. Moreover, the surface quality can be further increased due to the improved accessibility of the lens surface during the polishing process.

The protruding shaped edge on the rear face of the lens is not hindering since at that point, there is no further processing because the optical quality of the surface has already been achieved during the chipless forming of the semi-finished part. Casting and injection molding processes as well as compression molding processes are preferably provided for this purpose.

To simplify the language, reference hereinafter is only made to semi-finished plastic parts which are produced by casting or injection molding processes. However, this always encompasses any other method for chipless forming, provided they are feasible (such as compression molding, for example), and also semi-finished parts made of mineral glass.

The front face of the semi-finished part may already be roughly adapted to the lens geometry which is to be generated. This results in material savings and reduced machining work.

The shaped edge is retained during all work steps and serves to handle and to clamp the workpiece. Its width, height and annular shape assure a good stability, and it serves throughout all processing steps as a support for the lens which is made inside and is connected with it.

Here again, the method offers the important advantage that all clamping tools can be standardized (unified) and that the workpiece can be clamped and processed without blocking or complex laser treatment, since the shaped edge of the workpiece is retained up to the last work step. Thanks to the support function of the shaped edge, no deformations on the lens portion will be caused by the machining forces.

If necessary, a recess (marking) is cast integral with the shaped edge which defines the axis of the rear lens face produced by casting. To manufacture semi-finished parts of plastic, glass molds are used which are designed according to the invention so as to allow an easy removal from the mold. Steel molds are used for producing semi-finished parts of mineral glass.

The machines and tools employed are similar to those already described above. In the method set forth below, they are only completed by casting machines and novel molds.

The mold consists of a rear mold part, a front mold part and a peripherally arranged sealing ring which connects the two mold parts. The design of the rear mold part is novel in that by contrast to the prior art, it is not a simple curved disk but comprises a peripheral extension or shoulder by which the specified shaped edge is formed integral with the semi-finished part.

Said extension or shoulder is preferably chamfered to ease the removal from the mold. A "nose" is provided in the chamfered region to produce the marking mentioned above.

The surface of the front mold part of the mold which is active during the casting process may be plane or may roughly correspond to the convex or concave lens front face to be produced, although without creating an optically active surface.

The surface of the rear mold part of the mold which is active during the casting process is designed so as to be adapted to generate the above mentioned surface geometries. The surface produced by the casting process is optically active, and in the case of toric or atoric geometry, it is graded in dioptre steps of 0.5 to 1 dpt. The adjustment of the thus produced lens to the prescription (prescription lens) is done by corresponding processing operations on the lens front face.

The relatively rough graduation of the rear mold part in steps of 0.5 to 1 dpt considerably reduces the number of molds required. By processing the front face of the lens, it is still possible to produce prescription lenses (see above).

The sequence of the process steps is as follows:

The semi-finished parts are produced on generally known manufacturing systems by means of the novel mold. They are preferably made of plastic, but it is also possible to produce semi-finished parts from mineral glass.

Then the shaped edge of the semi-finished parts is clamped in the workpiece holders of conventional processing machines and the front faces are processed on these machines by milling, turning, grinding, smoothing and polishing. If the lens to be produced is an eyeglass lens, the first steps of said mechanical processing will comprise a thickness optimization of the lens.

More precisely, the eyeglass frame is known, and the eyeglass lens thickness is adapted to that frame. Eyeglass lenses which are thicker in the center than at the edge (plus-lenses) are processed so as to present a thickness in the region of the future frame which approximately corresponds to the edge of the frame. Eyeglass lenses which are thinner in the center than at the edge (minus-lenses) are processed in such manner that the center is as thin as possible in view of their stability. In this way, eyeglass lenses with the smallest possible weight are produced.

For producing eyeglass lenses, the geometry of the convex front face of the lens is designed so as to provide, in combination with the concave rear face of the lens, optical properties which comply with the prescription on which the manufacture is based.

The mechanical processing steps are followed by the coating and the marking of the optical axis. The shaped edge is retained during all the operations mentioned, and it serves to clamp and to handle the workpiece in the respective machines and devices.

Only after completion of the coating and the marking is the actual eyeglass lens separated from the shaped edge. For this purpose, the workpiece is clamped with its edge on the workpiece spindle of a milling machine, and the inner contour of the eyeglass lens is cut out by means of an end mill cutter of small diameter. However, various other methods are alternatively contemplated for performing said cutting out. For example, a waterjet may be used.

In a further embodiment, for which independent protection is claimed, the blanks which are used are semi-finished parts which are produced by chipless forming processes. Semi-finished parts are preferred which are made from plastic and produced by casting or injection molding processes. However, compression molding processes and semi-finished parts made from mineral glass are also contemplated.

At that point, the convex front face of the lens already has optical quality which has been generated by the chipless forming processes. The front face has a spherical or aspherical surface with dioptre steps of ¼, for example. In principle, however, also other surface shapes are possible. Bifocal surfaces and progressive surfaces are considered as well.

What is new with these material-optimized semi-finished parts is that they have a shaped edge in the peripheral area of the convex front face of the lens (with optical active surface) which is formed integral with the semi-finished part during the manufacture of the latter by chipless forming processes.

Said shaped edge sensibly protrudes over the convex front face of the lens. In the subsequent processing steps, the shaped edge serves to clamp the workpiece (semi-finished part) in the clamping tools of the processing machines and stabilises the eyeglass lens that is being produced in the peripheral area since it is retained until the last processing step.

Due to the fact that, with the method according to the invention, the shaped edge is provided on the convex front face of the semi-finished part, and that the latter is clamped with it in the respective processing machines, the rear face of the lens can be freely processed without the presence of a hindering edge. This is an important advantage.

Considerable cost-savings can be achieved particularly in the smoothing and polishing processes because it is possible to use efficient tools. Moreover, a good surface quality can be achieved due to the unhindered accessibility of the lens surface during the polishing process.

The protruding shaped edge on the convex front face of the lens will not bother since at that point, there is no further processing. In fact, the optical quality of the surface has there already been produced during the chipless forming of the semi-finished part. The methods preferred for this purpose are casting and injection molding processes as well as compression molding processes.

To simplify the language, reference hereinafter is only made to semi-finished plastic parts produced by casting or injection molding processes. However, this always encompasses any other method for chipless forming, provided it is feasible (such as compression molding, for example), and also semi-finished parts made of mineral glass.

With the chipless forming process, the concave rear face of the semi-finished part may already be roughly adapted to the lens geometry to be generated. This results in material savings and reduced machining work. However, the number of semi-finished parts which have to be kept in stock will increase, as will the storage costs.

The shaped edge is retained during all processing steps and serves to handle and to clamp the workpiece. Its width, height and annular shape assure good stability, and it serves throughout all processing steps as support for the lens which is made inside and is connected with it.

Since the shaped edge of the workpiece is retained up to the last work step, the method offers the important advantage that all clamping tools can be standardized (unified) and that the workpiece can be clamped and processed without blocking or complex laser treatment. Due to the support capacity of the shaped edge, no deformations on the lens portion will be caused by the machining forces.

If necessary, the shaped edge is provided with a recess (marking) which is cast integral with the shaped edge and defines the axis of the lens front face generated by casting. To produce semi-finished parts of plastic, glass molds are preferably used which are designed according to the invention so as to allow an easy removal from the mold. Steel molds are used for producing semi-finished parts of mineral glass.

The machines and tools which are used correspond to the prior art. There is no need for CNC controlled machines and corresponding special tools. In fact, any machine and tool may be used which has been employed in connection with the previous generally performed blocking procedure and which is commercially available.

Likewise, continued use is possible of the formulations and machine settings for processing the concave rear face of the lens which have been adopted by the manufacturers in connection with the blocking procedure. In any case, however, the expensive and environmentally harmful blocking is no longer required since the workpieces are clamped on the shaped edge.

To perform the method according to the invention, the manufacturer of eyeglass lenses and their sub-suppliers only need the novel molds for producing the semi-finished parts. These molds can be used on existing casting machines.

The mold consists of a rear mold part, a front mold part and a peripherally arranged sealing ring which connects the two mold parts. What is novel with that mold is the design of its front part which, in contrast to the prior art, it is not a simple negatively curved disk but comprises a peripheral extension or shoulder formed to integrate the specified shaped edge with the semi-finished part. Said extension or shoulder is preferably chamfered to ease removal from the mold. A "nose" may be provided in the region of this chamfer to produce the afore-mentioned marking.

The surface of the rear mold part may be plane or may roughly correspond to the rear face of the lens to be produced, although without creating an optically active surface.

The surface of the front mold part which is active during the casting process is designed so as to be adapted to generate the required surface geometries. The surface of the lens front face produced by the casting process is optically active, and in the usual case with spherical or aspherical geometry and toric or atoric geometry, respectively, it is graded by steps of 0.25 dpt, for example. This front face of the lens produced by casting may also comprise bifocal or progressive surfaces. The further adaptation of the lens to be produced according to an eyeglass prescription is done by corresponding processing operations on the rear face of the lens.

The sequence of process steps is then as follows:

The semi-finished parts are produced on generally known manufacturing systems by means of the novel mold. They are preferably made of plastic, but it is also possible to produce semi-finished parts from mineral glass.

Then the semi-finished parts are clamped with their shaped edge in the workpiece holders of conventional processing machines, and the concave rear face is processed on these machines by milling, turning, grinding, smoothing and polishing.

Complex multi-axle CNC machines may be employed, but their use is not mandatory for the execution of the method according to the invention because the geometries to be produced are relatively simple, such as spherical or aspherical surfaces and toric or atoric surfaces, respectively, without bifocal surface elements. In that case, the more complicated geometry with bifocal surfaces or progressive surfaces is on the convex front face of the lens which has been produced by chipless forming processes.

If the lens to be produced is an eyeglass lens, the first steps of said mechanical processing will comprise a thickness optimization of the lens.

More precisely, the eyeglass frame is known, and the eyeglass lens thickness is adapted to that frame. Eyeglass lenses which are thicker in the center than at the edge (plus-lenses) are processed so as to present a thickness in the region of the future eyeglass frame which approximately corresponds to the edge of the frame. Eyeglass lenses which are thinner in the center than at the edge (minus-lenses) are processed in such manner that the center is as thin as possible in view of their stability. In this way, eyeglass lenses with the smallest possible weight are produced. For producing eyeglass lenses, the geometry of the concave rear face of the lens is designed so as to provide, in combination with the already existing convex front face of the lens, the desired optical properties complying with the prescription on which the manufacture is based.

The mechanical processing steps are followed by the coating and the marking of the optical axis. The shaped edge is retained during all the operations mentioned, and it serves to clamp and to handle the workpiece in the respective machines and standardized devices.

Only after completion of the coating and the marking is the actual eyeglass lens is separated from the shaped edge. For this purpose, the workpiece is clamped with its shaped edge on the workpiece spindle of a milling machine, and the inner contour of the ophthalmic lens is cut out by means of an end mill cutter of small diameter. However, further methods are alternatively contemplated for performing said cutting out. For example, a waterjet may be used.

BRIEF DESCRIPTION OF THE DRAWINGS

Further features, details and advantages will become apparent from the reading of the claims and from the following description of embodiments in connection with the drawings, wherein:

DETAILED DESCRIPTION OF THE INVENTION

The present example of alternative 1 of the first embodiment provides a plastic blank with a plane front face, whereas its rear face presents a spheroidisation with an unprocessed surface. This example is one of several alternatives of methods and devices which are provided in connection with plus lenses. However, the same applies accordingly for neutral lenses and minus lenses.

The illustrations of the devices do not show the machines themselves but only their tool and workpiece spindles with the processing and clamping tools attached to them. This simplification was selected for ease of illustration of details of the devices according to the invention.

Figure 1:
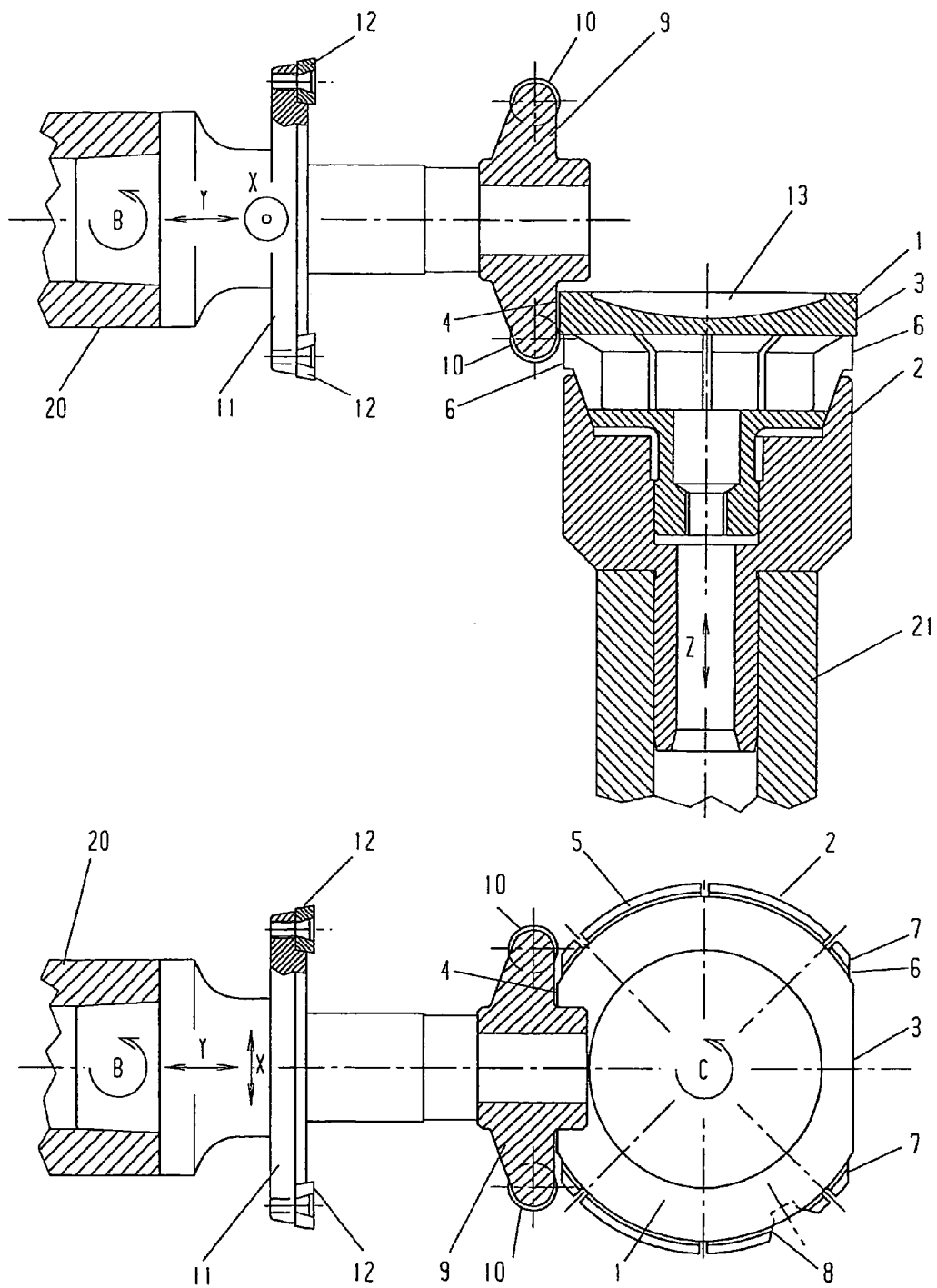
FIG. 1 shows the production of the two flattenings (3) and (4) on the milling/turning machine in a front view and a top view (sectional views)

FIG. 1 shows the production of the two flattenings 3 and 4 on the milling/turning machine in a front view and a top view (sectional views).

The plastic blank 1 is clamped in a clamping tool 2 which is connected with the workpiece spindle 21 of the milling/turning machine.

In this processing step, the workpiece spindle 21 performs translatory movements (advance movements) in the Z axis. In the C axis, on the other hand, it only performs short rotary movements (180°) when the first flattening 3 is completed and the second flattening 4 is about to be milled.

As shown in FIG. 1, two recesses 6 are laterally provided on the clamping tools 2 which allow the plastic blank 1 to be processed in these two regions so that the flattenings 3 and 4 can be milled. So the clamping and centring edge 5 of the clamping tool 2 ends at the edges 7 and presents a further recess 8 for the subsequent milling of the indexing.

The two flattenings 3 and 4 are produced by means of a plain milling cutter 9 which is provided with circumferential milling blades 10 of a relatively small diameter (e. g. 11 mm), since it is used again at a later time to produce the surface geometry of the front face and the rear face of the lens.

The plain milling cutter 9, together with the tool storage 11 for the lathe tools 12 which is only used later, is attached to the tool spindle 20. The tool spindle 20 performs translatory movements along the X axis (feed) and continuous rotary movements around the B axis.

The flattenings 3 and 4 are produced by milling in usual manner. The use of the milling/turning machine for this purpose offers the important advantage that the polar coordinates of the flattenings 3 and 4 as well as their dimensions are already well known in the control system of the machine and may be used for all further milling and turning operations.

Figure 2:
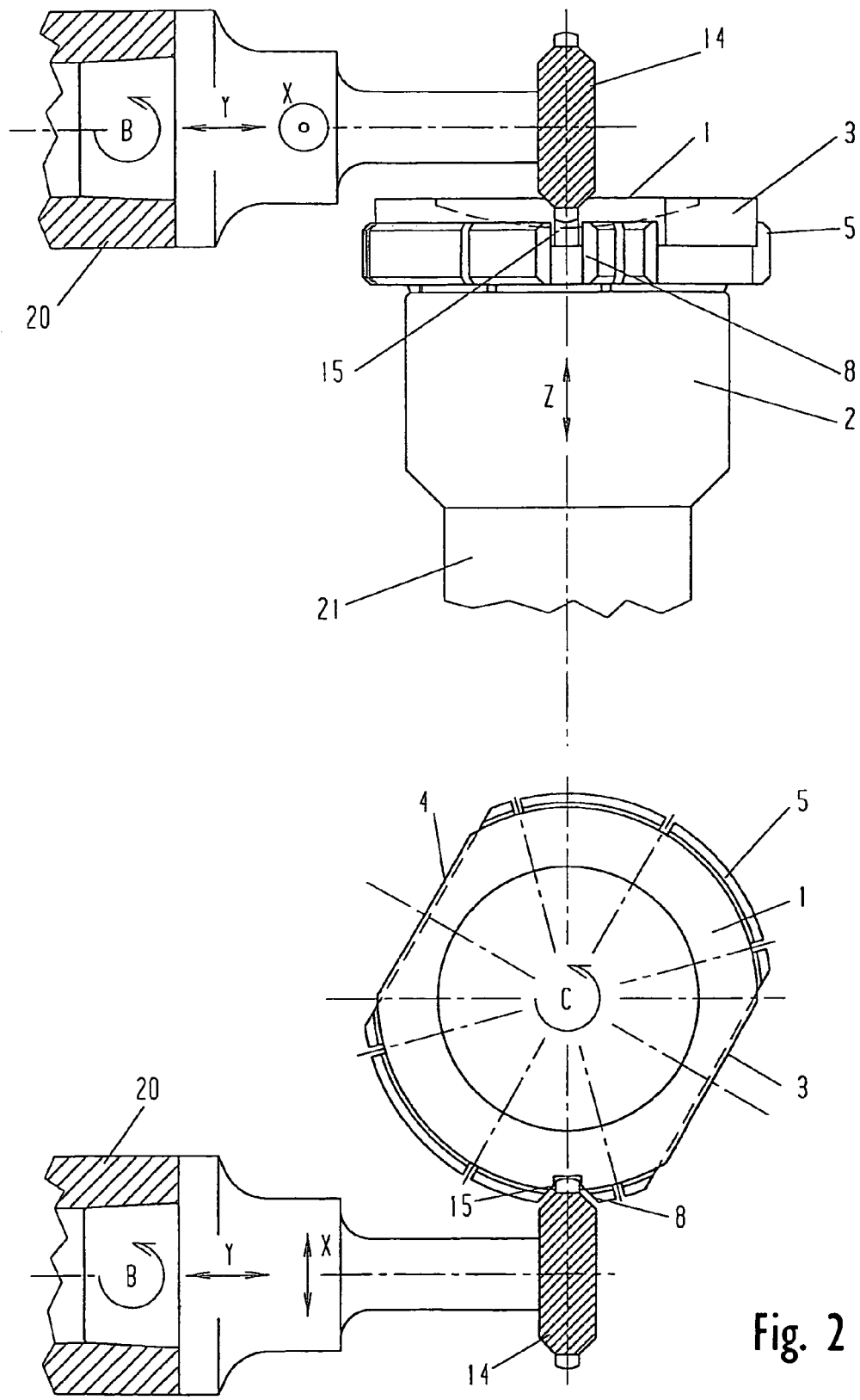
FIG. 2 shows the production of the indexing (15) on the milling/turning machine in a front view and a top view (partial views)

FIG. 2 shows the production of the indexing 15 on the milling/turning machine in a front view and a top view.

Again, the processing is carried out on a milling/turning machine, with the plastic blank 1 remaining clamped in the same clamping tool 2, as described above with reference to FIG. 1.

The processing with a plain milling cutter 14 can take place once the plastic blank 1 is brought into its processing position by a short movement of the workpiece spindle 21 in the C axis and the plain milling cutter 14 is correctly positioned by movements in the X axis and the Y axis. During the processing, the plain milling cutter 9 continuously rotates around the B axis and is moved along the X axis (advance movement).

The plain milling cutter 14 penetrates the recess 8 in the clamping and centring edge 5 of the clamping tool 2 and produces on the plastic blank 1 the indexing 15 in form of a notch.

FIG. 2 shows a special plain milling cutter 14. Alternatively, however, the indexing 15 may be produced by means of the plain milling cutter 9 which is used for the other work steps. This would offer the advantage that tool change is avoided.

In the description of the following work steps, the plastic blank 1 with the two flattenings 3 and 4 and the indexing 15 is referred to as workpiece 16. This reference number will also be used after completion of further processing operations.

Figure 3A:
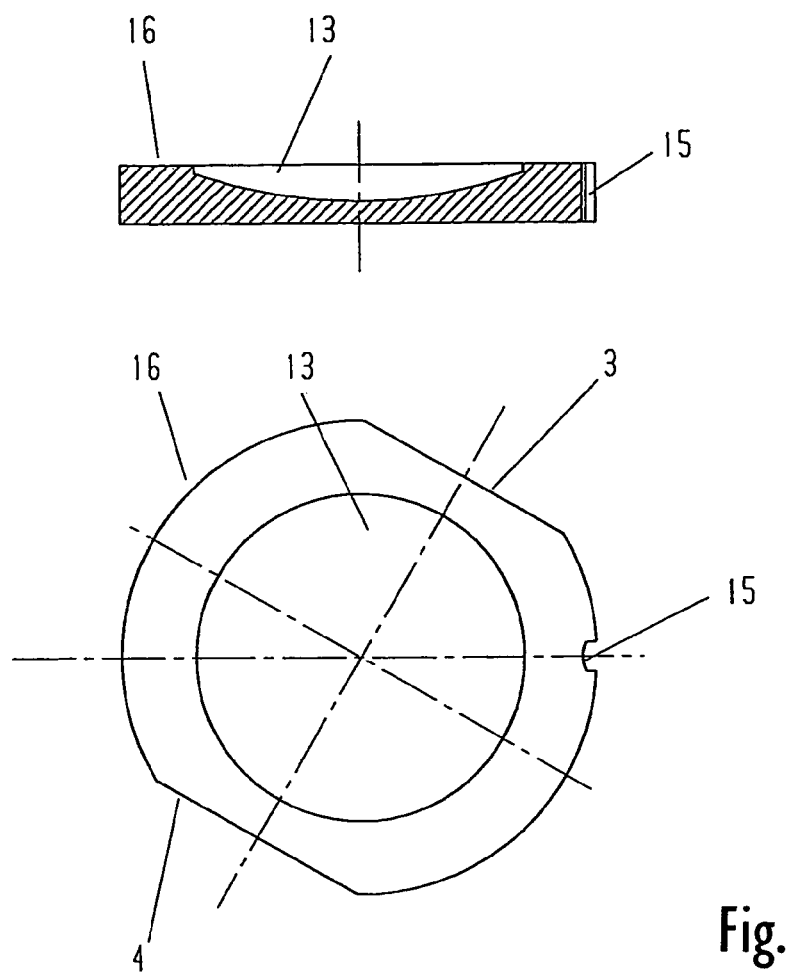
FIG. 3a shows the state of process of the workpiece (16) after the production steps according to FIGS. 1 and 2 with the flattenings (3) and (4) and the indexing (15), FIG. 3b alternatively shows the state of process of the workpiece (16) if the latter is provided with a larger slot (35) and the indexing (15) instead of the flattenings (3) and (4)

FIG. 3a illustrates the state of process of the workpiece 16 after the production steps according to FIGS. 1 and 2.

Either illustration shows the indexing 15. In the bottom illustration with view onto the spheroidisation 13, in addition, the two flattenings 3 and 4 can be seen. Thus, the position of the workpiece 1 is exactly defined. The speroidisation 13 on the rear face of the lens has not been processed yet.

Figure 3B:
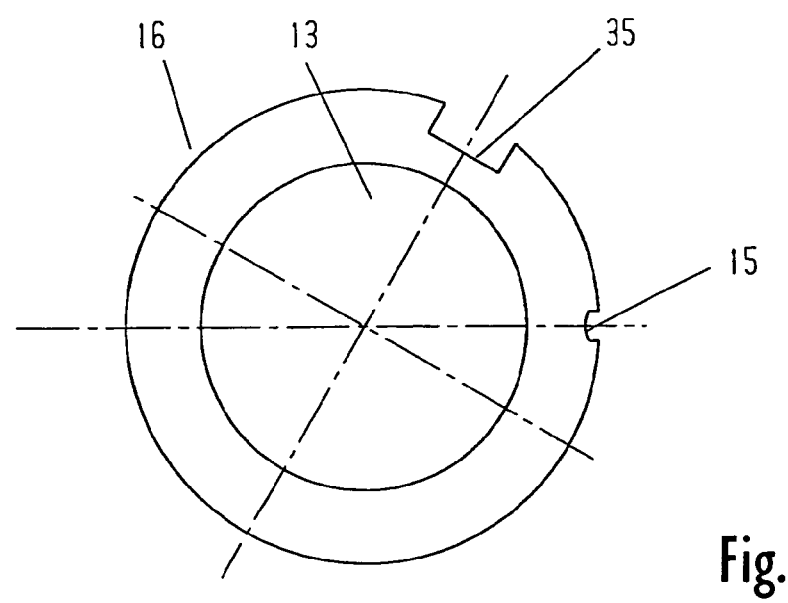

FIG. 3b illustrates the alternative state of process of the workpiece 16 if the latter has been provided with a larger slot 35 and the indexing 15 instead of the flattenings 3 and 4.

In the top view looking onto the speroidisation 13, the slot 35 and the indexing 15 can be seen which are arranged circumferentially and offset to one another, forming an angle of less than 90° between them. Thus the position of the workpiece 16 is exactly defined.

Figure 4:
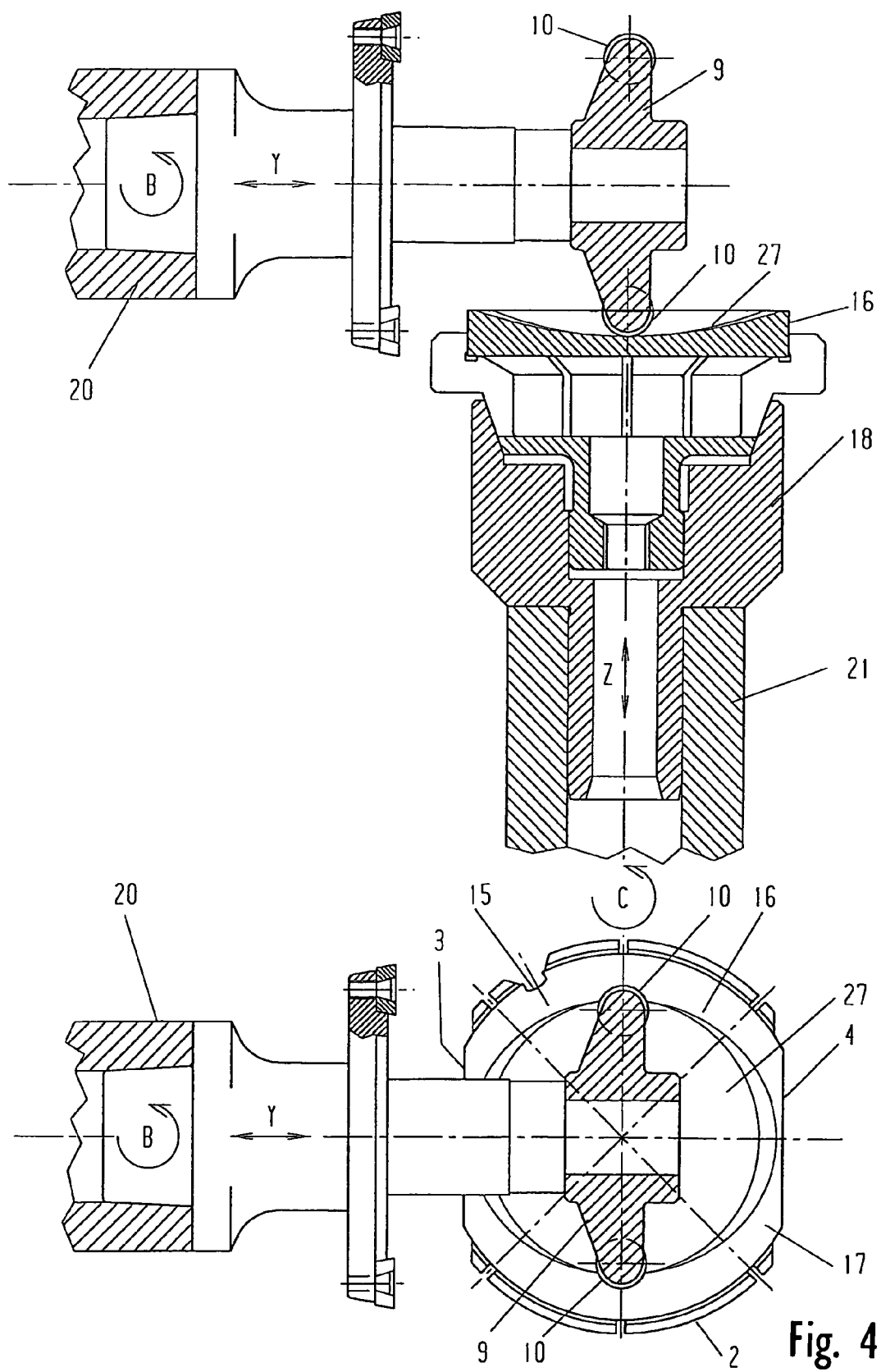
FIG. 4 shows the production of the surface geometry on the concave rear face of the lens (27) by means of a plain milling cutter (9) on the milling/turning machine in a front view and a top view (sectional views)

FIG. 4 illustrates the production of the surface geometry on the concave rear face 27 of the lens by means of a plain milling cutter 9 on the milling/turning machine in a front view and a top view (sectional views).

Just as with the previous work steps, the processing is performed on the milling/turning machine by means of the plain milling cutter 9. The workpiece 16 is connected with the workpiece spindle 21 by means of the clamping tool 18. The processing of the surface geometry is performed with the same blocking setup as was provided for the production of the flattenings 3 and 4 and the indexing 15. This allows an optimal positional precision between the concave rear face 27 of the lens and the indexing 15.

During the processing, the workpiece 16 continuously rotates in the C axis in speed and phase controlled manner. Simultaneously, it performs translatory movements in the Z axis which serve as advance movements. These movements in the Z axis occur by way of highly dynamic oscillations.

The plain milling cutter 9 is attached to the tool spindle 20 and rotates continuously in the B axis. Simultaneously, it is moved with the tool spindle 20 in the Y axis. The addition of the movements of the workpiece 16 and the plain milling cutter 9 provides the desired surface geometry on the concave rear face 27 of the lens.

The processing of the given geometry on the concave rear face 27 of the lens by milling begins at the edge of the workpiece 16 and is completed once the plain milling cutter 9 has reached the center of the latter.

In principle, however, either of the processing techniques specified herein (milling and turning) may alternatively begin in the center of the lens and end on the outer edge.

In order to be able to produce the desired geometry, the Y, Z and C axes are connected to one another during these processing operations. The rotation of the plain milling cutter 9 around the B axis is carried out without such connection. The drawing shows the workpiece 16 at the end of that processing step.

Once that processing is completed, a plane face 17 is produced in the peripheral area of the concave rear lens face of the workpiece 16 which serves as a support when the workpiece 16 is turned over and reclamped for the processing of the convex front face of the lens.

The plane face 17 allows for precise determination of the relative height of both the concave rear face 27 of the lens and the convex front face of the lens 19 relative to the plane face 17 of the workpiece 16 and allows for an accurate definition of the lens thickness.

This is very important for the manufacture of a thickness optimized ophthalmic lens because the exact value of the elevation of the concave rear face 27 of the lens, as seen in the direction of the thickness of the workpiece 16, must be known for the subsequent processing of the convex front face of the lens 19.

Figure 5:
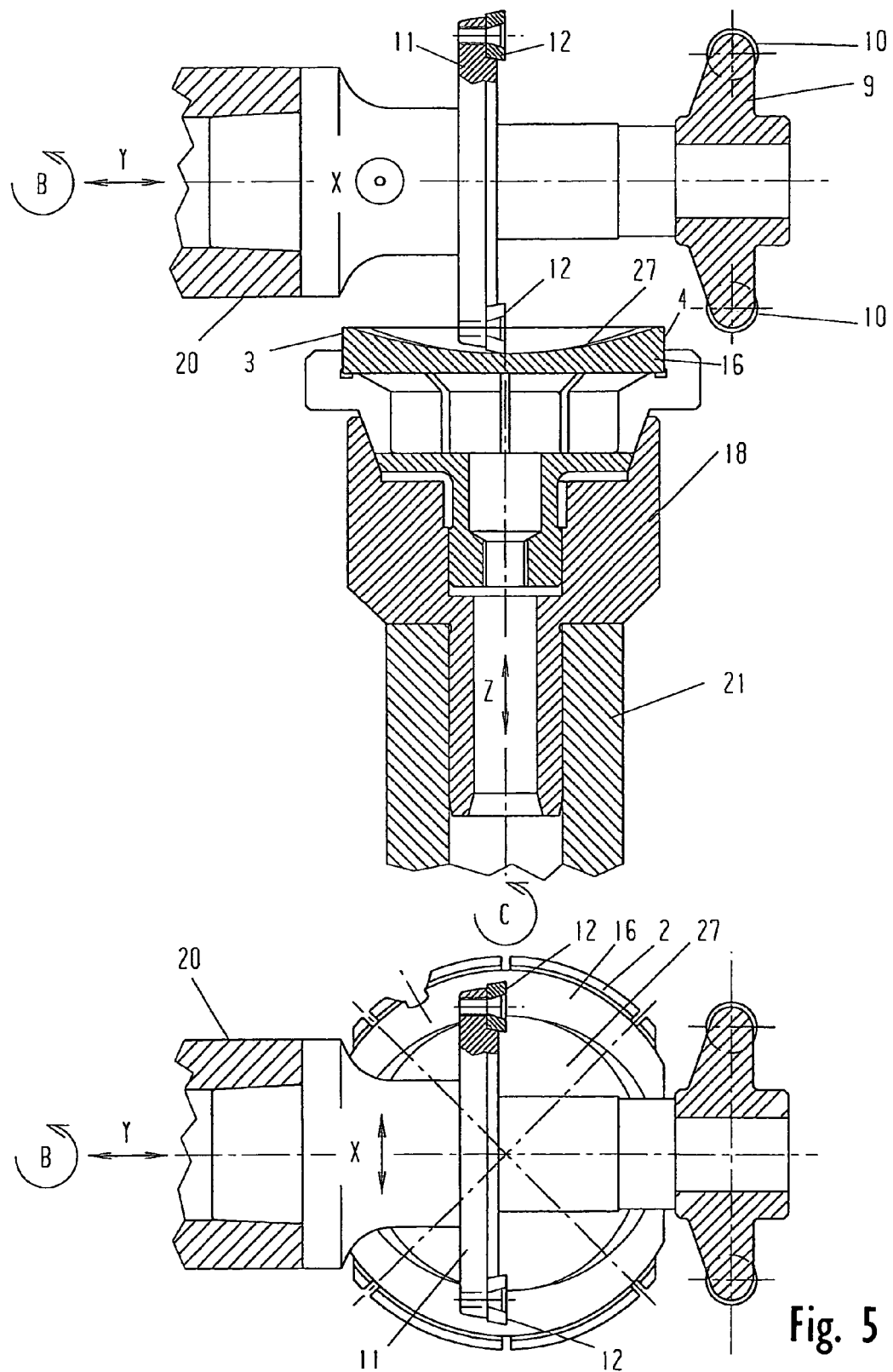
FIG. 5 shows the production of the surface geometry in the fine region and the levelling of the surface by means of a lathe tool (12) on the concave rear face of the lens (27) in a front view and a top view (sectional views)

FIG. 5 illustrates the production of the surface geometry in the fine region and the smoothing of the surface by means of a lathe tool 12 on the concave rear face 27 of the lens in a front view and a top view (sectional views).

For such processing, the tool spindle 20 is rotated with the tool storage 11 for the lathe tools 12 around the B axis by some angular degrees until the desired lathe tool 12 is in the start position for processing.

Then the B axis of the tool spindle 20 is switched into a controlled state in which it is able to perform small rotary movements which track the setting angle of the main axis of the lathe tool 12 relative to the surface of the workpiece 16 (=angle tracking movements).

After that, the tool spindle 20 is moved in the X and Y axes in such manner that the selected lathe tool 12 is brought into the start position above the workpiece 16.

Seen from above, said start position of the lathe tool 12 on the edge of the workpiece 16 is offset by 90° relative to the position of the plain milling cutter 9, since also the blades 10 of the plain milling cutter 9 and the blades of the lathe tools 12, respectively, are offset by 90° relative to each other.

Then the workpiece spindle 21 with the workpiece 16 is caused to rotate around the C axis in a controlled manner (speed and phase controlled) and simultaneously translatorily moved upwards along the Z axis until the lathe tool 12 contacts the workpiece 16.

Depending on the position of the blade, the lathe tool 12 on the tool spindle 20 is then moved in the direction of the X axis over the workpiece 16 until it reaches the center of the latter (feed movement), with the workpiece spindle 21 with the workpiece 16 rotating again around the C axis in a speed and phase controlled manner and oscillating in the direction of the Z axis (advance movements).

During the rotation around the B axis, the tool spindle 20 with the lathe tool 12 performs the small rotary movements mentioned (angle tracking movements) with the result that in tracking the geometry of the lens, the main axis of the lathe tool 12 is always positioned at the same given optimal cutting angle (e. g. right angle) relative to the surface of the workpiece (in this example the concave rear face 27 of the lens).

This is particularly advantageous if the blade of the lathe tool 12 is not circular but is e. g. a diamond blade. In the absence of angle tracking movements around the B axis, the relative cutting angle would permanently change due to the three-dimensional geometry of the lens.

The angle tracking movements of the lathe tool 12 in the B axis are controlled and depend on the positions of the X, Z and C axes when (as in this exemplary case) the feed movement of the lathe tool 12 in the X axis takes place.

Furthermore, the angle tracking movements in the B axis could allow the setting angle of the lathe tool 12 to be permanently varied relative to the surface of the workpiece 16 if that should be necessary in a specific case and it were not convenient to keep the setting angle constant.

Figure 8A:
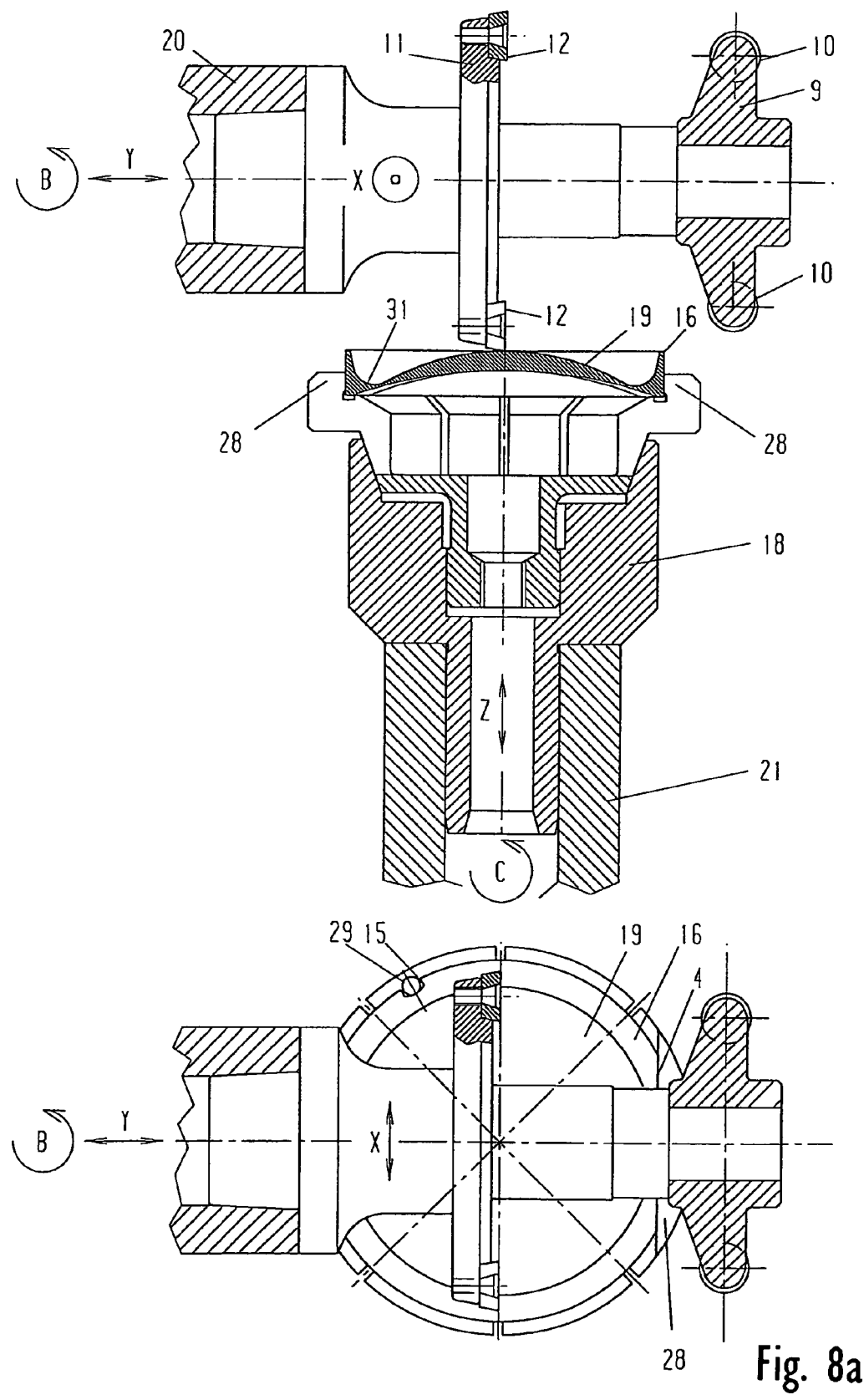
FIG. 8a shows the production of the surface geometry in the fine region and the levelling of the surface on the convex front face of the lens (19) by means of a lathe tool (12) on the milling/turning machine in a front view and a top view (sectional views) at the end of operations.
Figure 8B:
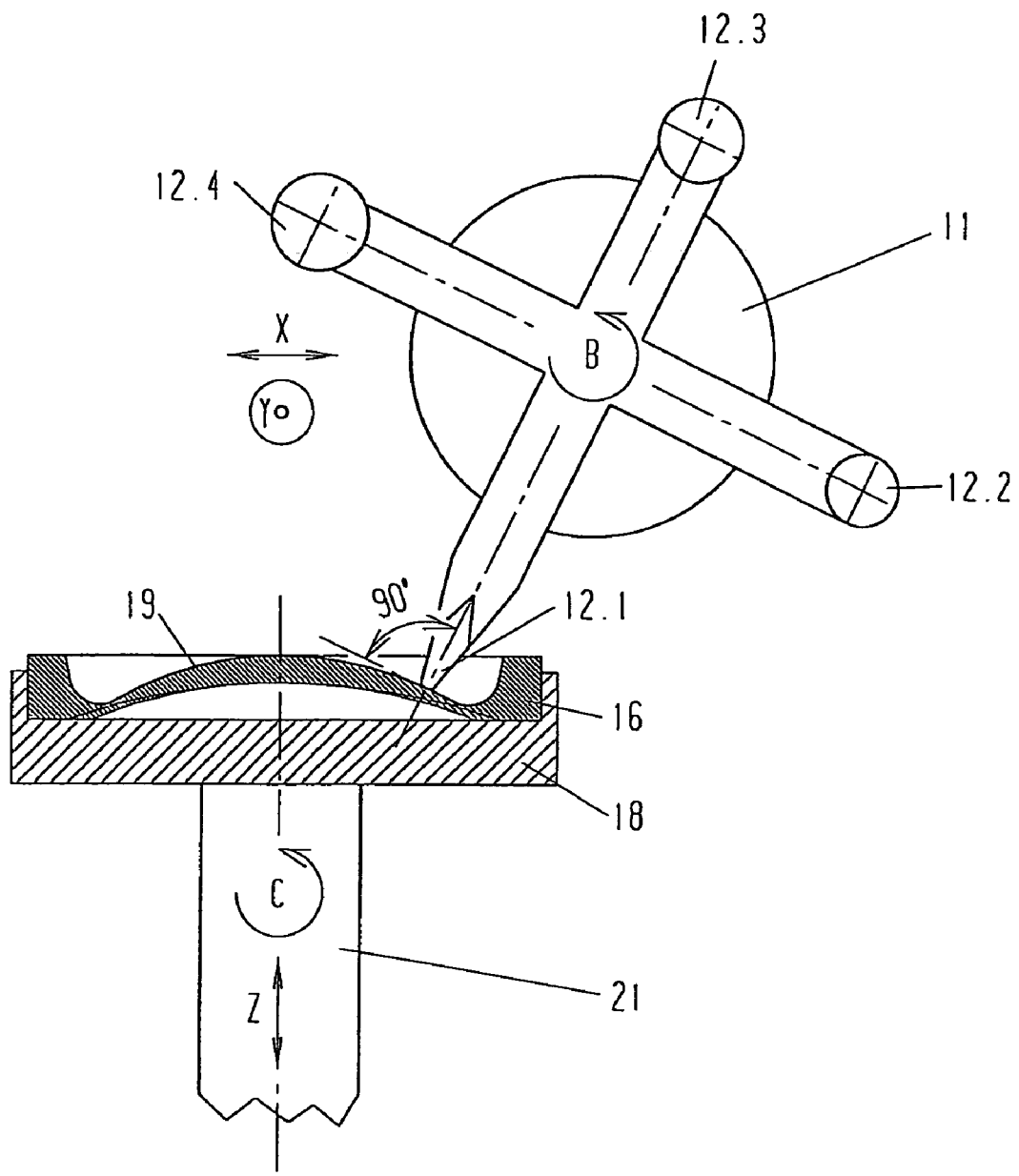
FIG. 8b shows the production of the surface geometry on the convex front face of the lens (19) by means of a lathe tool (12.1) on the milling/turning machine with angle tracking movements in the B-axis in a front view (sectional views)

The angle tracking movements will be further elucidated with reference to FIG. 8b in connection with the processing of the convex front face of the lens 19.

The X axis and the Z axis as well as the B axis and the C axis are electrically connected to one another in the control system of the machine in order to render the above-described movement sequence possible.

By cooperation of the movements of the lathe tool 12 in the X and B axes and the movements of the workpiece 16 in the Z and C axes, the geometry on the concave rear face of the lens 27, which has been previously produced by milling, is tracked in the fine region so that a very little roughness depth will be generated on the surface. The work step turning is completed once the lathe tool 12 has reached the center of the workpiece 16.

Figure 6:
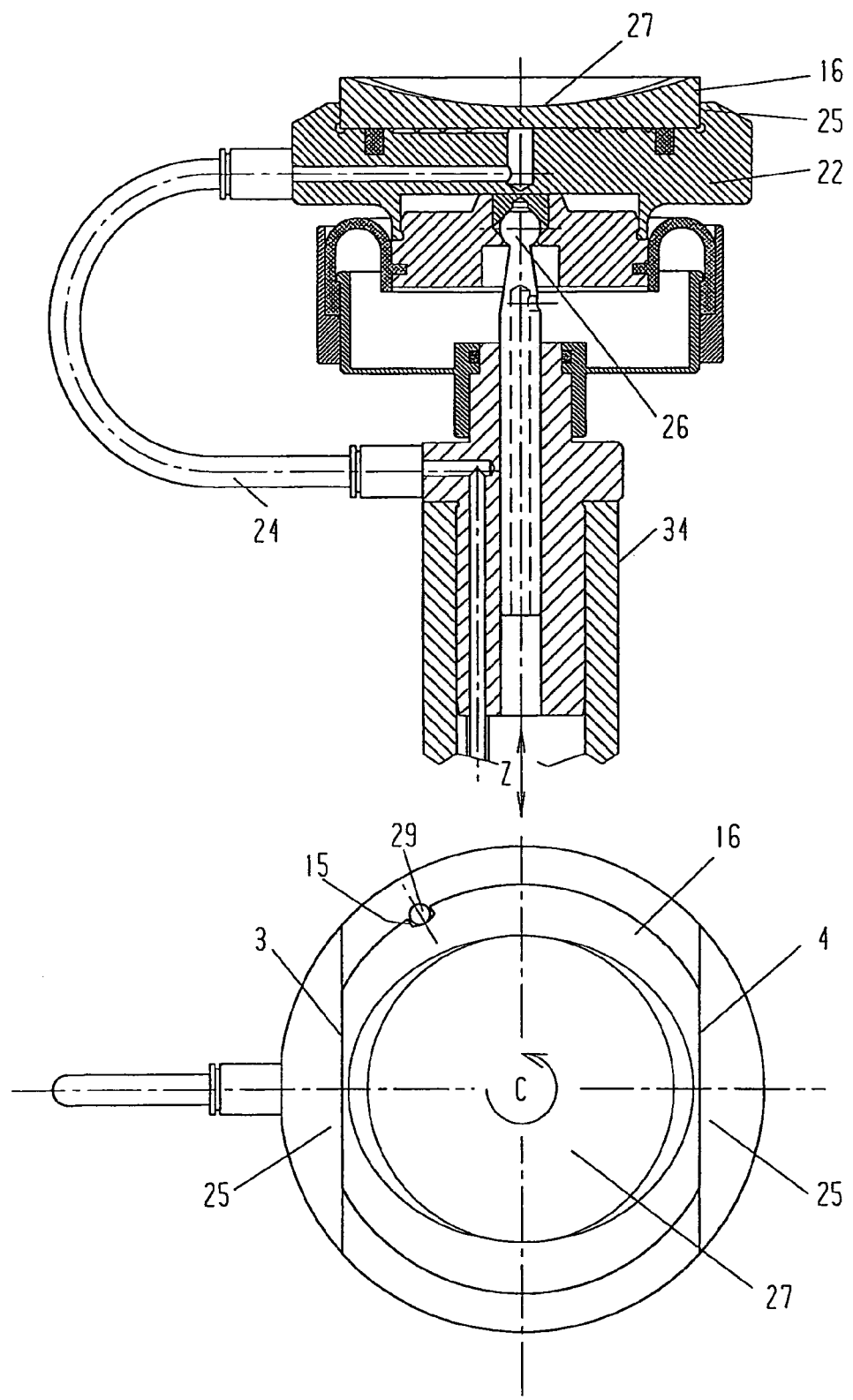
FIG. 6 shows the smoothing and polishing of the concave rear face of the lens (27) on a smoothing and polishing machine in a front view (sectional view) and a top view. The grinding and polishing tool is not shown because they it is not subject-matter of the proposed method.

FIG. 6 illustrates the smoothing and polishing of the concave rear face 27 of the lens on a smoothing and polishing machine in a front view (sectional view) and a top view. The smoothing and polishing tool is not shown because it is not subject-matter of the proposed method.

For smoothing and polishing, the workpiece 16 is inserted into a vacuum clamping tool 22 of a smoothing and polishing machine, with the two flattenings 3 and 4 providing antirotatory protection in addition. Two corresponding shaped parts 25 adjoin the flattenings in the area of the upper side of the vacuum clamping tool 22. This offers the advantage that a higher grinding and polishing pressure may be applied without shifting the workpiece 16.

Vacuum is applied to the vacuum clamping tool 22 via air ducts in the workpiece spindle 34 of the smoothing and polishing machine and a tube connection 24. The upper part of the vacuum clamping tool 22 is gimbal-supported by means of a globe joint 26.

Smoothing and polishing are performed in conventional manner, with the workpiece spindle 34 and the workpiece 16 rotating and a forming tool (preferably a flexible forming tool) attached to the tool spindle (neither of them shown) being placed onto the surface of the workpiece 16 to be smoothed or polished, and likewise performing rotary movements around the tool axis.

The smoothing and polishing tool is provided with a grinding pad or a polishing foil, and the smoothing and polishing involves the addition of a suspension. A slight tilt of the tool spindle relative to the workpiece spindle 34 entails a small relative movement between the smoothing and polishing tool and the workpiece 16, whereby smoothing and polishing are effected.

It is preferred to use the specified flexible tool as smoothing and polishing tool since it allows for significant savings in tool costs. The smoothing and polishing operation will not be further described herein because it is not subject-matter of the proposed method.

However, referring to FIG. 6, it is important that the workpiece 16 is clamped using the two flattenings 3 and 4 in cooperation with the shaped parts 25 and using the indexing 15 in cooperation with the bolt 29.

After smoothing and polishing, the finished surface of the concave rear face of the lens 27 is cleaned, e. g. by ultrasound, and is coated with a protective lacquer to prevent it from being damaged during further processing of the workpiece 16.

Figure 7:
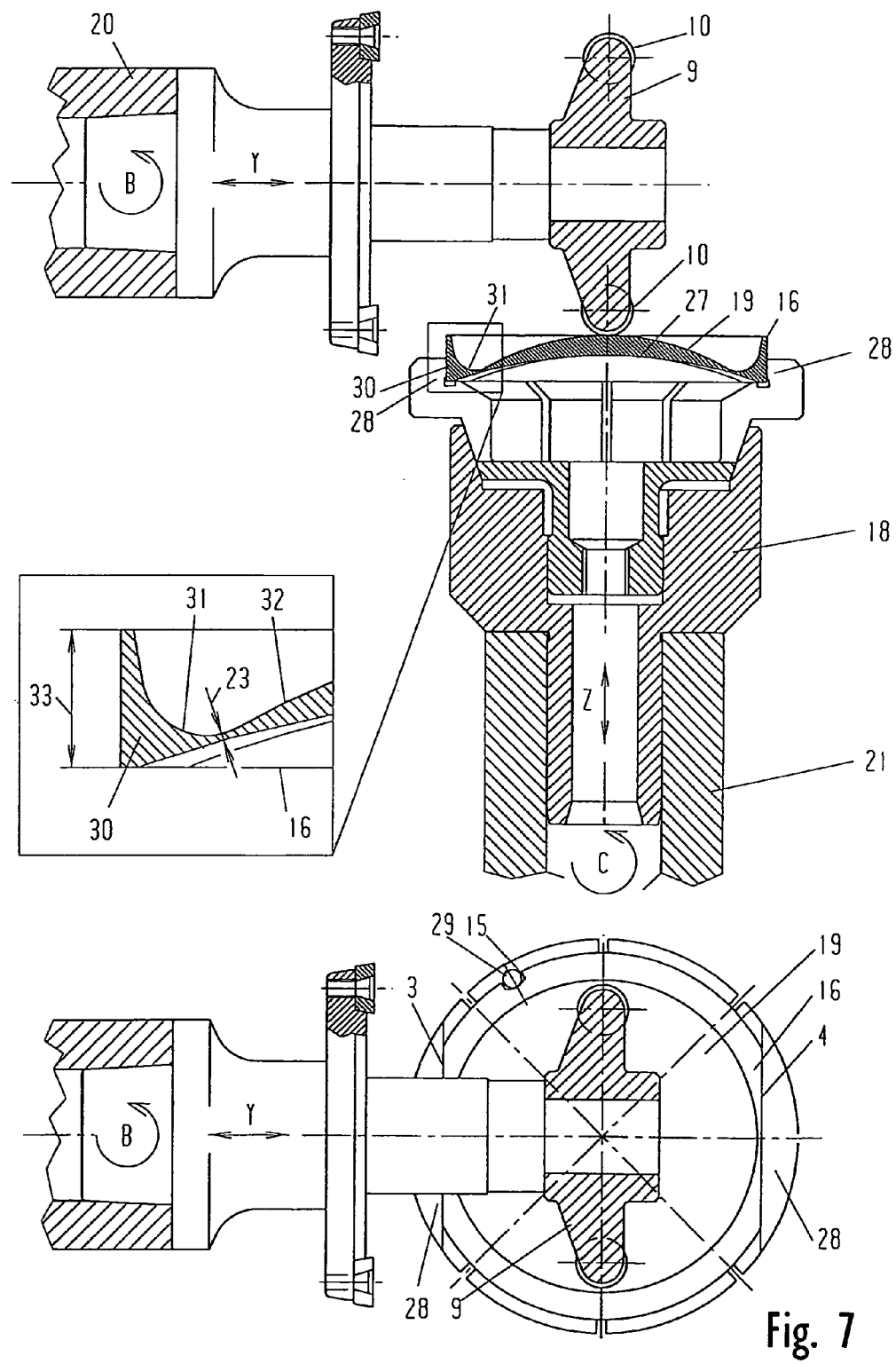
FIG. 7 shows the production of the surface geometry on the convex front face of the lens (19) by means of a plain milling cutter (9) on the milling/turning machine at the end of operation in a front view and a top view (sectional views) as well as an enlarged partial view of the peripheral area of the cut workpiece (16)

FIG. 7 shows the production of the surface geometry on the convex front face of the lens 19 by means of a plain milling cutter 9 on the milling/turning machine at the end of operation in a front view and a top view (sectional views) as well as an enlarged partial view of the peripheral area of the cut workpiece 16.

The workpiece 16 is clamped again onto the milling/turning machine to allow the convex front face of the lens 19 to be milled. Here again, the outer periphery is used for clamping, with the two flattenings 3 and 4 and the indexing 15 assuring accurate positioning.

The two flattenings 3 and 4 are also used for clamping, with clamping elements 28 connected to the clamping tool 18 engaging the two flattenings 3 and 4 and providing secure mounting. A bolt 29 serves to receive the indexing 15, with said bolt 29 being likewise connected to the clamping tool 18 and perfectly matching the indexing 15 which partially encloses the bolt 29. In this work step, it is particularly important that the workpiece 16 be firmly mounted in the clamping tool 18, since a large amount of machining has to be performed by the plain milling cutter 9.

The rough contour of the surface geometry on the convex front face of the lens 19 is produced by milling. This work step is performed as already described with reference to the concave rear face 27 of lens. The surface geometry which has been produced may have any design and matches the given prescription (prescription lenses) in cooperation with the concave rear face 27 of the lens.

The processing of the convex front face 19 of the lens by the plain milling cutter 9 begins again on the outer circumference and ends once the tool has reached the center of the workpiece 16 by feed along the Y axis. Due to the convex shape of the front face 19 of the lens, the plain milling cutter 9 must initially penetrate deep into the material in the peripheral area of the workpiece 16 in order to make it possible, within the scope of the thickness optimization, to attain the small wall thickness 23 in the peripheral area of the lens. For this purpose, the workpiece spindle 21 is accordingly moved along the Z axis (advance movement).

This work step, too, may be performed with reversed tool feed, the tool then being moved from the center of the workpiece 16 to its edge.

Since the outer annular region 30 which serves for clamping and stiffening the lens shall be retained, the advance movement between the plain milling cutter 9 and the workpiece 16 will not begin until the plain milling cutter 9 has reached the predetermined position above the workpiece 16 by moving along the Y axis. This position is selected so as to keep the distance between the plain milling cutter 9 and the outer circumference of the workpiece 16 sufficiently large to achieve the desired size of the annular region 30 when the small wall thickness 23 has been attained.

At the beginning of the milling operation, a circular groove 31 is produced on the edge of the workpiece 16 in connection with the generation of the small wall thickness 23 and the retention of the annular region 30 of large thickness 33.

Due to the shape of the plain milling cutter 9, the circular groove 31 is provided with a cross-sectional radius corresponding at least to the radius of the milling blades 10 of the plain milling cutter 9.

The circular groove 31 presents the transition between the actual ophthalmic lens 32 and the outer annular region 30 and allows, due to its shape, on the one hand for the small thickness 23 at the edge of the ophthalmic lens 32, and on the other hand for the large thickness 33 at the annular region 30.

After the production of the small wall thickness 23, the milling process for producing the geometry on the convex front face 19 of the lens goes on as the workpiece 16 with the workpiece spindle 21 continues rotating around the C axis in a speed and phase controlled manner while performing quick translatory movements (oscillations) which serve as advance movements.

Simultaneously, the plain milling cutter 9 with the tool spindle 20 is moved along the Y axis in a controlled manner (feed movement), rotating at constant speed (not controlled) around the B axis of the tool spindle 20. The Y, Z and C axes are connected to one another in the control system of the machine in such manner that the addition of the movements initially produces the specified groove 31 and subsequently the surface geometry of the convex front face 19 of the lens. The milling process is completed once the plain milling cutter 9 has reached the center of the workpiece 16.

FIG. 8a shows the production of the surface geometry in the fine region and the smoothing of the surface on the convex front face of the lens 19 by means of a lathe tool 12 on the milling/turning machine in a front view and a top view (sectional views) at the end of operations.

For such processing, the tool spindle 20 with the tool storage 11 for the lathe tools 12 is rotated around the B axis by some angular degrees until one of the lathe tools 12 is in the start position for the processing. After that, the tool spindle 20 is moved along the X and Y axes in such manner that the selected lathe tool 12 is brought into the start position above the workpiece 16.

That start position of the lathe tool 12 on the edge of the workpiece 16 is analogous to that already described with reference to FIG. 5.

Then the workpiece spindle 21 with the clamping tool 18 and the workpiece 16 is caused to rotate around the C axis in a controlled manner (speed and phase controlled) and simultaneously translatorily moved upwards along the Z axis until the lathe tool 12 contacts the workpiece 16 in the area of the circular groove 31.

Depending on the position of the blade, the lathe tool 12 on the tool spindle 20 is then moved in the direction of the X axis over the workpiece 16 until it reaches its center (feed movement), with the workpiece spindle 21 and the workpiece 16 continuing to rotate around the C axis in a speed and phase controlled manner and oscillating in the direction of the Z axis (advance movements).

During rotation and during the feed movement of the lathe tool 12 along the X axis, it simultaneously performs the aforementioned angle tracking movements around the B axis which serve to keep the relative setting angle constant between the main axis of the lathe tool 12 and the surface of the workpiece (here the convex front face of the lens 19).

The X and Z axes as well as the B and C axes are electrically connected to one another in the control system of the machine to render the desired movement sequence possible.

By cooperation of the movements of the lathe tool 12 in the X and B axes and the movements of the workpiece 16 in the Z and C axes, the geometry of the workpiece 16 on its convex front face of the lens 19 previously produced by milling is tracked in the fine region, thus generating here a very small roughness depth on the surface, too. Once the lathe tool 12 has reached the center of the workpiece 16, the work step turning is completed.

FIG. 8b shows the production of the surface geometry on the convex front face of the lens 19 by means of the lathe tool 12.1 on the milling/turning machine with angle tracking movements around the B axis in a front view (sectional views).

The considerably simplified FIG. 8b serves to illustrate in detail the work step turning with angle tracking movements und the function of the tool storage 11.

The workpiece 16 is placed into a clamping tool 18 that is connected with the workpiece spindle 21 and performs the controlled advance movements along the Z axis and the controlled rotary movements around the C axis which have already been mentioned repeatedly.

The processing by turning is performed on the convex front face of the lens 19 of the workpiece 16. For this purpose, a lathe tool 12.1 is used which is mounted to a tool storage 11, with the main axis of the lathe tool 12.1 in FIG. 8b forming a right angle with the surface of the workpiece 16.

Depending on the extent to which the lathe tool 12.1 is moved over the surface of the convex front face of the lens 19 by the feed movement along the X-axis, the tool storage 11 with the lathe tool 12.1 performs angle tracking movements around the B axis in order to keep the specified right angle constant between the main axis of the lathe tool 12.1 and the surface of the workpiece.

The lathe tools 12.1 to 12.4 are attached to the tool storage 11. Prior to the actual work step turning, one of the lathe tools 12.1 to 12.4 can be rotated into the start position for processing according to manufacture requirements. To select one of the desired lathe tools 12.1 to 12.4, the tool spindle 20 with the tool storage 11 is rotated around the B axis accordingly.

The lathe tools 12.1 to 12.4 represented in the figure have different diameters. It is understood that lathe tools 12.1 to 12.4 available with other distinctive features and in other numbers may also be attached to the tool storage 11.

Figure 9:
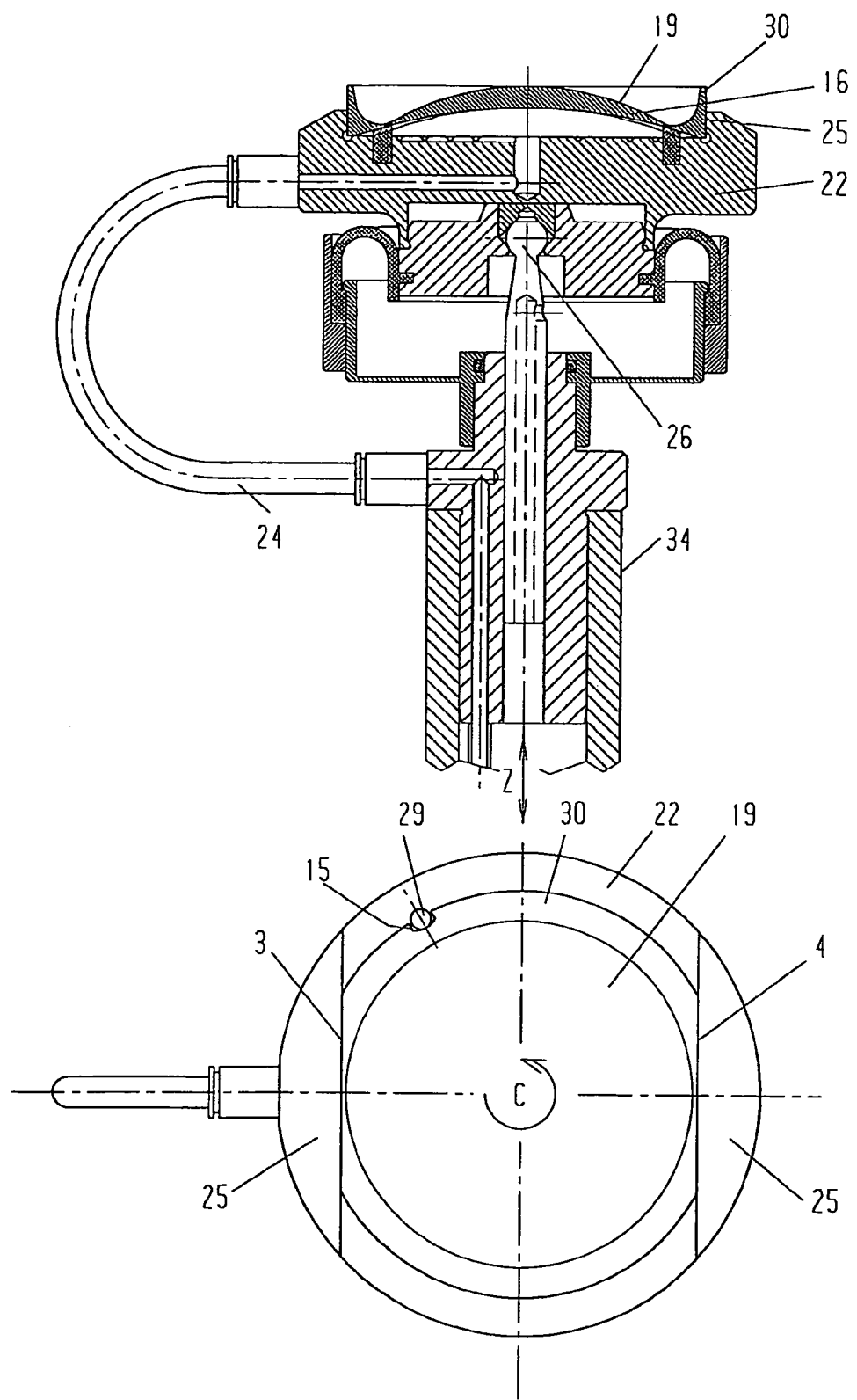
FIG. 9 shows the smoothing and polishing of the convex front face of the lens (19) on a smoothing and polishing machine in a front view (sectional view) and a top view. The smoothing and polishing tool is not shown because it is not subject-matter of the proposed method.

FIG. 9 shows the smoothing and polishing of the convex front face of the lens 19 on a smoothing and polishing machine in a front view (sectional view) and a top view. The smoothing and polishing tool is not shown because it is not subject-matter of the proposed method.

For smoothing and polishing, the workpiece 16 is inserted again into the vacuum clamping tool 22 on the workpiece spindle 34 of a smoothing and polishing machine, with the two flattenings 3 and 4 providing antirotatory protection in addition. Two corresponding shaped parts 25 adjoin the flattenings in the area of the upper side of the vacuum clamping tool 22.

The set-up of the smoothing and polishing machine and the smoothing and polishing operations are similar to those already described with reference to FIG. 6.

Here again, it is preferred to use the flexible tool described as a smoothing and polishing tool since it allows for significant savings in tool costs in this work step, too. The smoothing and polishing operation will not be further described herein because it is not subject-matter of the proposed method.

However, with reference to FIG. 9, it is important that the clamping of the workpiece 16 is performed using the two flattenings 3 and 4 in cooperation with the shaped parts 25 and using the indexing 15 in cooperation with the bolt 29. Another essential aspect is the stiffening of the workpiece 16 by the annular region 30 since the structure of the workpiece is exposed to high stress, particularly in the course of vacuum clamping processes.

It is also important that the vacuum clamping tool 22 has the same shape and the same dimensions for all workpieces 16 to be processed, as the outer contour of the annular region 30 is standardized.

Once the smoothing and polishing is completed, the finished surface of the convex front face of the lens 19 is cleaned, e. g. by ultrasound, using standardized washing frames whereby costs are considerably reduced.

Then a very fine marking, e. g. an engraving, is applied on the convex front face of the lens 19, which contains information concerning the optical properties of the ophthalmic lens and the logo of the manufacturer. Again, the annular region 30 with its standardized dimensions as well as the flattenings 3 and 4 and the indexing 15 provide significant advantages. Merely one single device is required for clamping the workpieces 16.

Subsequently, a coating is applied to the workpiece 16 to improve the optical properties and the scratch resistance. For this process, standardized masks are used which in turn reduce the manufacturing costs.

Figure 10A:
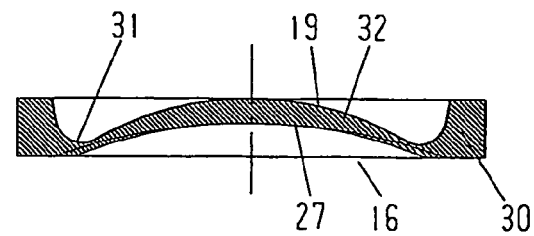
FIG. 10a shows the state of process of the workpiece (16) after the production steps according to FIGS. 1 to 9 for a plus lens (sectional view and top view)
Figure 10A:
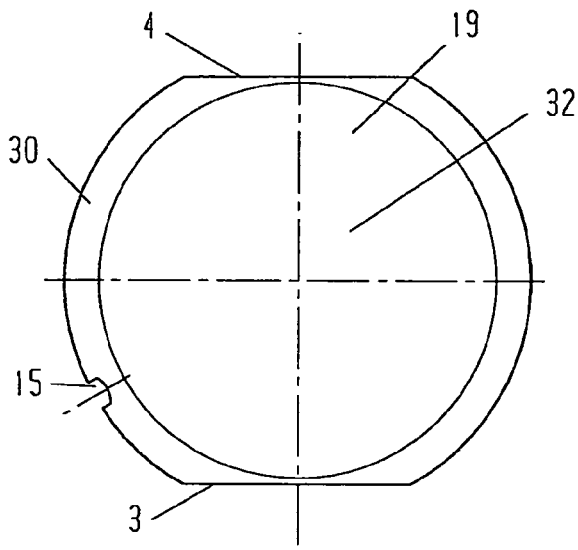

FIG. 10a shows the state of process of the workpiece 16 after the production steps according to FIGS. 1 to 9.

In the bottom drawing, the two flattenings 3 and 4 as well as the indexing 15 can be seen. The top drawing is a sectional view of the workpiece 16. The circular groove 31 is quite pronounced in accordance with the shape of the lens.

Both the convex front face 19 and the concave rear face 27 of the lens are finished and provided with the coating. The ophthalmic lens is provided with an engraving (not shown) for designating the ophthalmic lens.

Figure 10B:
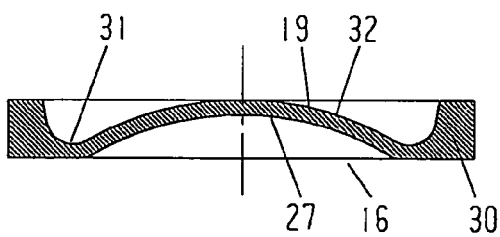
FIG. 10b shows the state of process of the workpiece (16) after the production steps according to FIGS. 1 to 9 for a neutral lens (sectional view)

FIG. 10b shows the state of process of the workpiece 16 after the production steps according to FIGS. 1 to 9 for a neutral lens (sectional view).

This figure essentially corresponds to FIG. 10a. The circular groove 31 here is quite pronounced, too.

Figure 10C:
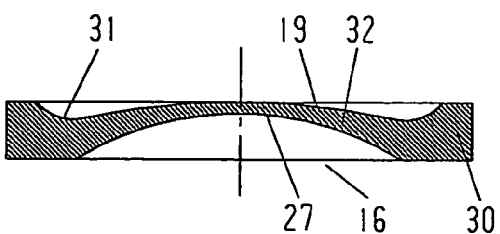
FIG. 10c shows the state of process of the workpiece (16) after the production steps according to FIGS. 1 to 9 for a minus lens (sectional view)

FIG. 10c shows the state of process of the workpiece 16 after the production steps according to FIGS. 1 to 9 for a minus lens (sectional view).

With minus lenses, the peripheral region of the ophthalmic lens 32 is thicker than the center. For geometrical reasons, the circular groove 31 is therefore less pronounced.

In a last work step (not shown), the actual ophthalmic lens 32 is separated from the annular region 30. For this purpose, the workpiece 16 is clamped on its edge and the actual ophthalmic lens 32 is fixed by means of vacuum and/or soft upper and lower clamping devices. After that, the separating cut is carried out, e. g. by means of an end mill cutter of small diameter.

This separating cut follows a contour line which corresponds to that of the eyeglass frame, with a small allowance for the further processing by the optician, if necessary. After a further cleaning, the ophthalmic lens 32 is ready for delivery.

FIGS. 11 and 12 show another variant of the method. The blanks which are used here are semi-finished parts produced by chipless forming. The semi-finished parts consist of plastic. They are produced by means of a mold tool 53.

Figure 11A:
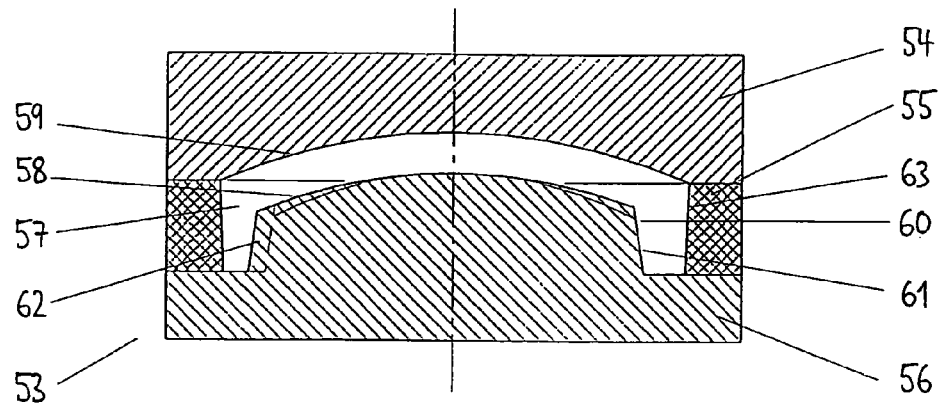
FIG. 11a shows a casting tool in a sectional view.

The mold 53 represented in FIG. 11a consists of a front mold part 54, a sealing ring 55 and a rear mold part 56. These three components enclose an inner hollow space 57 in which the melt is introduced to produce the semi-finished part 41.

This melt may be a fluid plastic suitable for optical purposes which subsequently undergoes a hardening process. However, mineral glasses are also suitable which are heated to their molten state for casting.

Figure 11B:
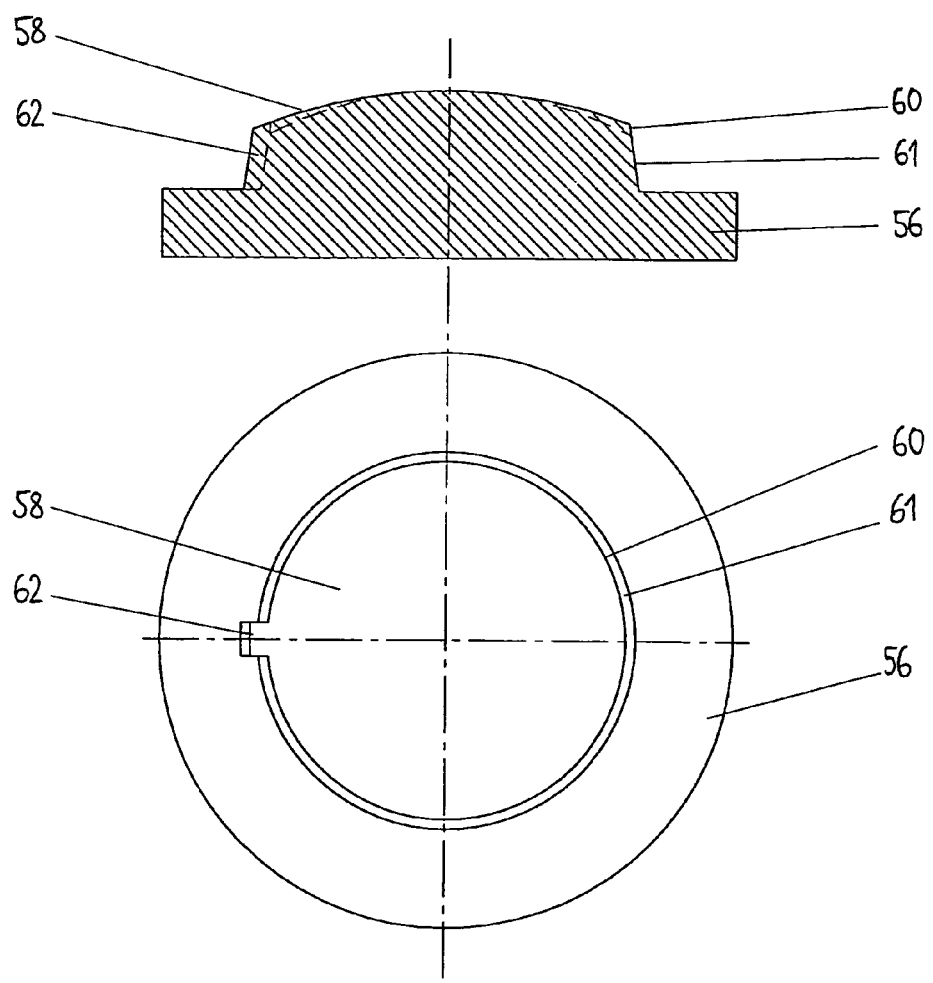
FIG. 11b shows the rear mold part in a sectional view and in a top view.

As shown in FIG. 11b, the mold side 58 of the rear mold part 56 which faces the semi-finished part 41 is provided with a fine-polished surface which is a negative impression of the concave rear face 42 of the lens to be produced. Dioptre steps of 0.5 to 1 dpt. are provided in order to minimise the number of the required back molds 56 for economical reasons.

The optical action of the finished ophthalmic lens 47 according to a given prescription is achieved by cooperation of the convex front face 45 of the lens and the concave rear face 42 of the lens.

The convex front face 45 of the lens is calculated and processed accordingly. In spite of the small number of back molds 56, it is possible to produce a prescription lens.

The mold side 59 of the front mold part 54 which faces the semi-finished part 41 does not produce an optically active surface. In the example shown, it has a slightly convex shape to reduce the machining effort in the subsequent work steps. The mold side 59 may also be plane.

According to the invention, the mold side 58 of the rear mold part 56 is provided with an extension or a shoulder 60 serving for forming the shaped edge 43 integral with the semi-finished part 41. The shoulder 60 has preferably a chamfered annular surface 61 to make removal from the mold easier.

The extension or shoulder 60 is of special advantage, particularly because it can be subsequently molded onto the numerous rear mold parts 56 which already exist in the production. This means significant cost savings.

A nose 62 is provided in the area of the annular surface 61 which serves to form the marking 44 integral with the semi-finished part 41. Said nose 62 is, therefore, orientated with great accuracy relative to the axis of the mold side 58.

To connect the front mold part 54 and the rear mold part 56, a sealing ring 55 with a chamfer 63 on its inner side is provided. Said chamfer also serves to make removal of the semi-finished part 41 from the mold 53 easier.

By varying the height in axial direction of the sealing ring 55, the thickness of the semi-finished part 41 can be selected so as to minimise the machining effort entailed by the thickness optimization of the ophthalmic lens 47.

The molds 53 preferably used for producing semi-finished parts 41 of plastic comprise a front mold part 54 and a rear mold part 56 made from mineral glass. This offers the advantage that glass is suitable for high precision processing on known optical machines and also easy to polish.

Another advantage is the corrosion resistance of glass which considerably simplifies the stock-holding of the molds 53. Removal of the semi-finished part 41 from the mold 53 is also particularly easy if the front mold part 54 and the rear mold part 56 consist of mineral glass, since the plastic material will not adhere to the mineral glass.

For the actual casting process, the mold 53 is inserted into an appropriate device or machine where the casting process takes place. Such devices and machines are prior art and are therefore not described in detail.

Following the hardening of the semi-finished part 41, the latter is removed from the mold by separating the front mold part 54 and the rear mold part 56 and removing the sealing ring 55. Subsequently, machining can take place, with the shaped edge 43 serving to clamp the workpiece 49.

Figure 12A:
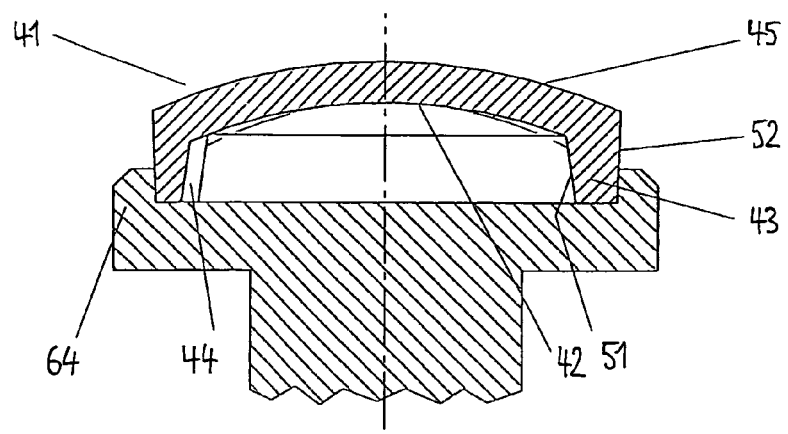
FIG. 12a shows the semi-finished part prior to the processing in a sectional view, clamped into a workpiece holder.

FIG. 12a is a sectional view of the semi-finished part prior to the processing, clamped into a workpiece receiver.

Owing to the casting process, the concave rear face 42 on the lens of the semi-finished part 41 is already of optically active quality. The concave rear face 42 of the lens will not be processed. The semi-finished part 41 has a peripheral shaped edge 43 which is cast integral with the latter. The shaped edge 43 is retained throughout the whole subsequent processing and serves to clamp the workpiece in a workpiece holder 64.

The shaped edge 43 has an annular shape and is provided with an inner chamfer 51 and an outer chamfer 52 on its inner and outer sides, respectively. Said chamfers serve to make removal of the semi-finished part 41 from the mold after completion of the molding easier.

On its left side, the shaped edge 43 is provided with a marking 44 which is cast integral with it and serves to identify the axis of the optically active rear face 42 of the lens.

The already slightly curved front face 45 of the semi-finished part 41 has no optical properties yet and needs to be processed. For this purpose, the semi-finished part 41 is clamped into the workpiece holder of a generally known processing machine.

Clamping is done by means of the shaped edge 43 which has a sufficient height so that the front face and hence the future front face 45 of the lens of the semi-finished part 41 protrudes sufficiently far over the workpiece holder 64. Thus the peripheral area of the front face 45 of the lens can also be processed without the processing tool colliding with the workpiece holder 64.

The processing machine with the different tools and the processing procedure will not be further described. In this regard, reference is made to the descriptions concerning FIGS. 1 to 10.

Figure 12B:
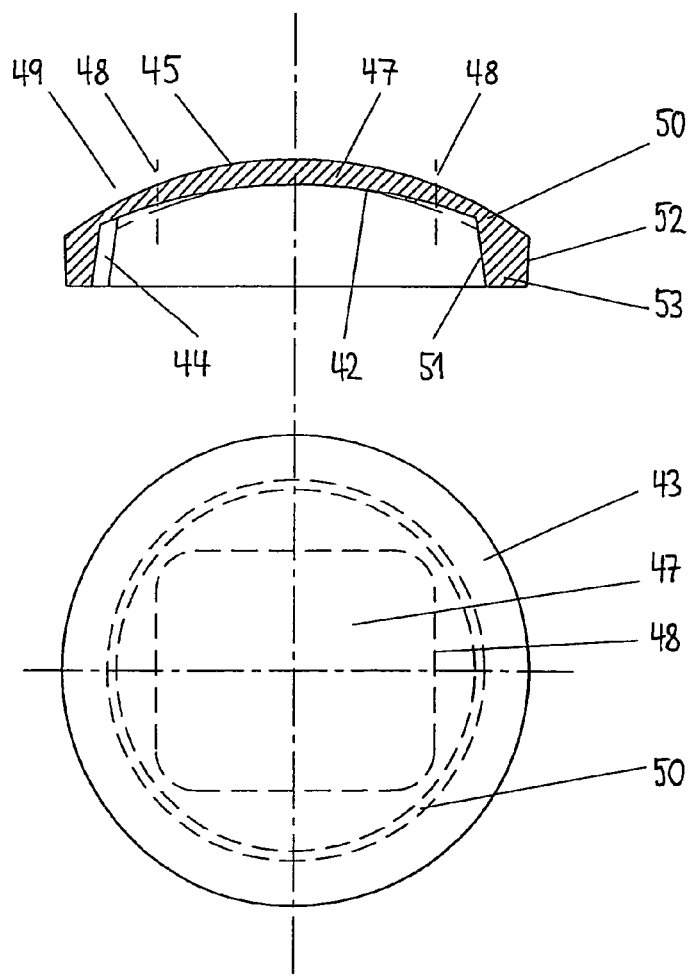
FIG. 12b shows the workpiece after the processing of the convex front face of the lens in a sectional view and in a top view.

FIG. 12b shows the workpiece after the processing of the convex front face 45 of the lens in a sectional view and in a top view.

The convex front face 45 of the lens has been processed and is provided with an optically active surface. Either lens face is finished, having received a coating and fine engravings which mark the optical axis.

The manufacture also involved a thickness optimization. The actual ophthalmic lens 47 is in the inner region of the workpiece 49 and is separated from the peripheral area 50 by the geometrical borderline 48. The peripheral area also includes the shaped edge 43.

The borderline 48 marks in the top view the contour of the finished ophthalmic lens with a small allowance for the further processing by the optician. The ophthalmic lens 47 of the represented example is thicker in the center than on the edge (plus-lens). Within the scope of the thickness optimization, the thickness of the edge of the ophthalmic lens 47 was therefore reduced along the borderline 48 so as to correspond to the width of the eyeglass frame.

Once the coating has been applied and the axis has been marked, the ophthalmic lens 47 is separated from the workpiece 49. For this purpose, the processing tool, e. g. a thin end mill cutter, is moved along the borderline 48 whereby the ophthalmic lens 47 is cut out. The processing is effected in such manner that the contour of the borderline 48 is retained.

It is also provided that the workpiece 49, as shown in FIG. 12b, is delivered to the optician who removes the peripheral area 50 and produces the contour along the borderline 58 himself.

Figure 13A:
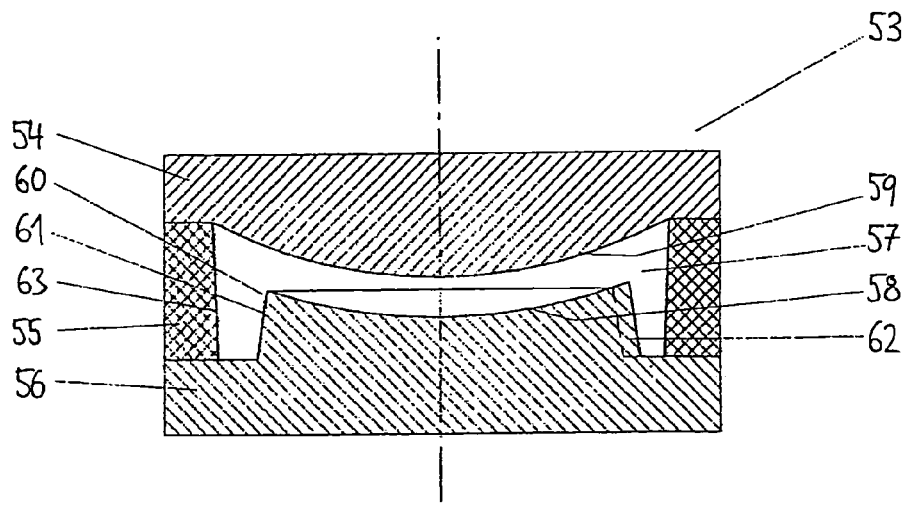
FIG. 13a shows a casting tool in a sectional view.
Figure 13B:
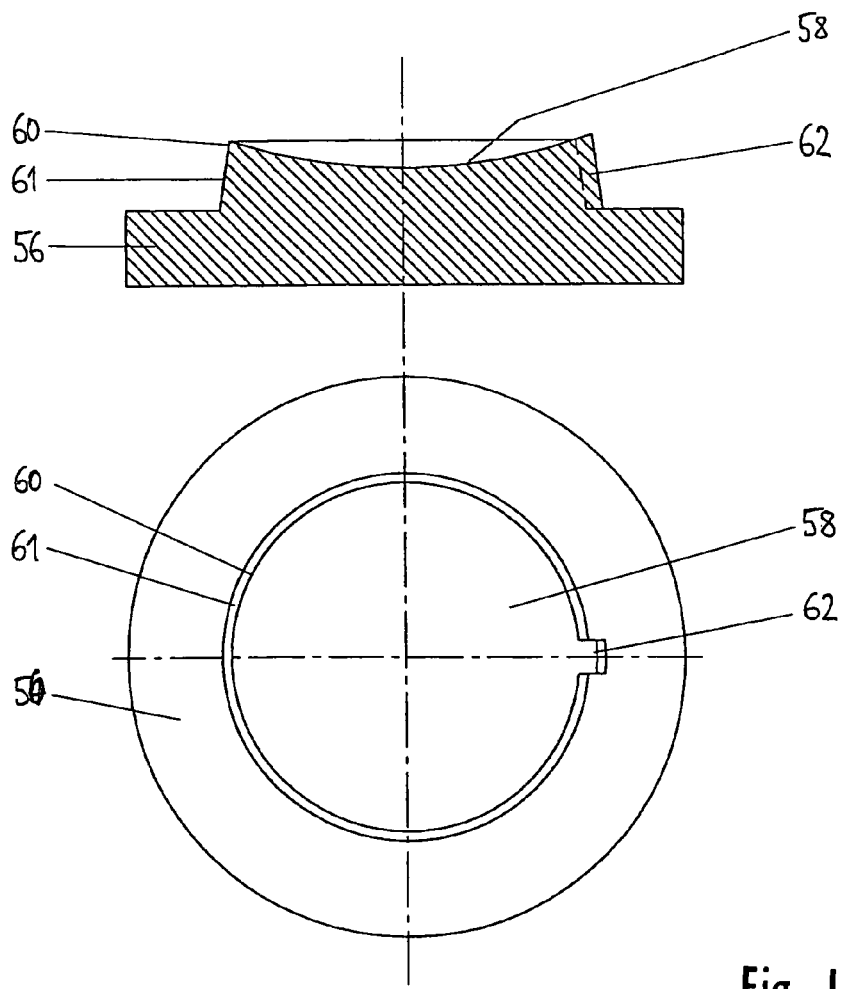
FIG. 13b shows the rear mold part in a sectional view and in a top view.

FIGS. 13 and 14 show yet another variant of the method according to the invention. The blanks used here are again semi-finished parts, produced in a mold 53 by chipless forming.

The represented mold 53 also consists of a front mold part 54, a sealing ring 55 and a rear mold part 56. These three components enclose an inner hollow space 57 in which the melt is introduced for producing the semi-finished part 41.

This melt may be a fluid plastic suitable for optical purposes which subsequently undergoes a hardening process. However, mineral glasses are also suitable which are heated to their molten state for casting.

The rear mold part 56 which faces the semi-finished part 41 is provided with a fine-polished surface which is a negative impression of the convex front face of the lens 45 to be produced. In order to minimise the number of the required rear mold parts 56, dioptre steps of 0.25 dpt or larger are provided for economical reasons.

The optical action of the finished ophthalmic lens 47 according to a given prescription is achieved by cooperation of the convex front face of the lens 45 and the concave rear face 42 of the lens which has been produced by mechanical processing. The concave rear face 42 of the lens is calculated and processed accordingly.

The mold face 59 of the front mold part 54 which faces the semi-finished part 41 does not produce an optically active surface. In the example shown, it has a slightly concave shape to reduce the machining effort in the subsequent work steps. However, the mold face 59 may also be plane.

According to the invention, the mold face 58 of the rear mold part 56 is provided with an extension or a shoulder 60 for forming the shaped edge 43 integral with the semi-finished part 41. The shoulder 60 has preferably a chamfered annular surface 61 to make removal from the mold easier.

A nose 62 is also provided in the area of the annular surface 61 which serves to form the marking 44 integral with the semi-finished part 41. The nose 62 is accurately orientated relative to the axis of the mold face 58.

To connect the front mold part 54 and the rear mold part 56, a sealing ring 55 having a chamfer 63 on its inner side is provided. Again, the chamfer 63 serves to make removal of the semi-finished part 41 from the mold 53 easier.

Figure 14A:
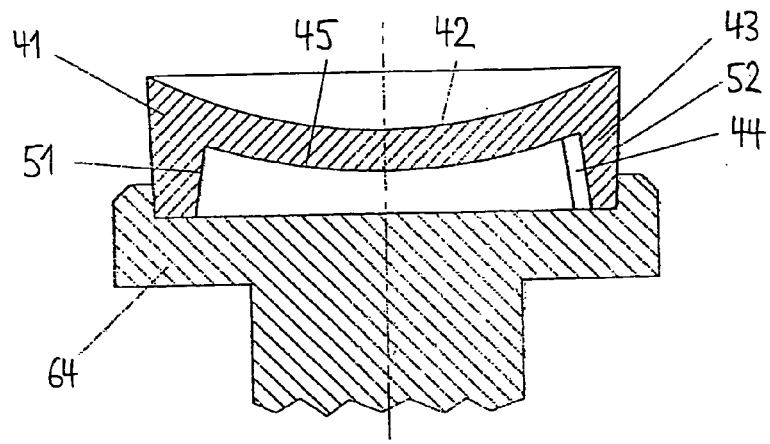
FIG. 14a shows the semi-finished part prior to the processing in a sectional view, clamped into a workpiece holder.

FIG. 14a shows the semi-finished part 41 prior to the processing in a sectional view, clamped into a workpiece holder 64.

The convex front face 45 of the lens on the semi-finished part 41 has already been generated with optically active quality by the casting process. The convex rear face of the lens 45 will not be processed. The semi-finished part 41 has a peripheral shaped edge 43 which is cast integral with the latter and protrudes over the convex front face 45 of the lens. The shaped edge 43 is retained throughout the whole subsequent processing and serves for clamping the workpiece in a workpiece holder 64.

The slightly concave rear face 42 of the semi-finished part 41 has no optical properties yet and must be processed. For this purpose, the semi-finished part 41 is clamped into the workpiece holder 64 of a generally known processing machine.

Clamping is done by means of the shaped edge 43 which is of sufficient height so that the concave rear face 42 of the semi-finished part 41 protrudes sufficiently far over the workpiece holder 24. Thus the peripheral area the concave rear face 42 can also be processed without the processing tool colliding with the workpiece holder 64.

Figure 14B:
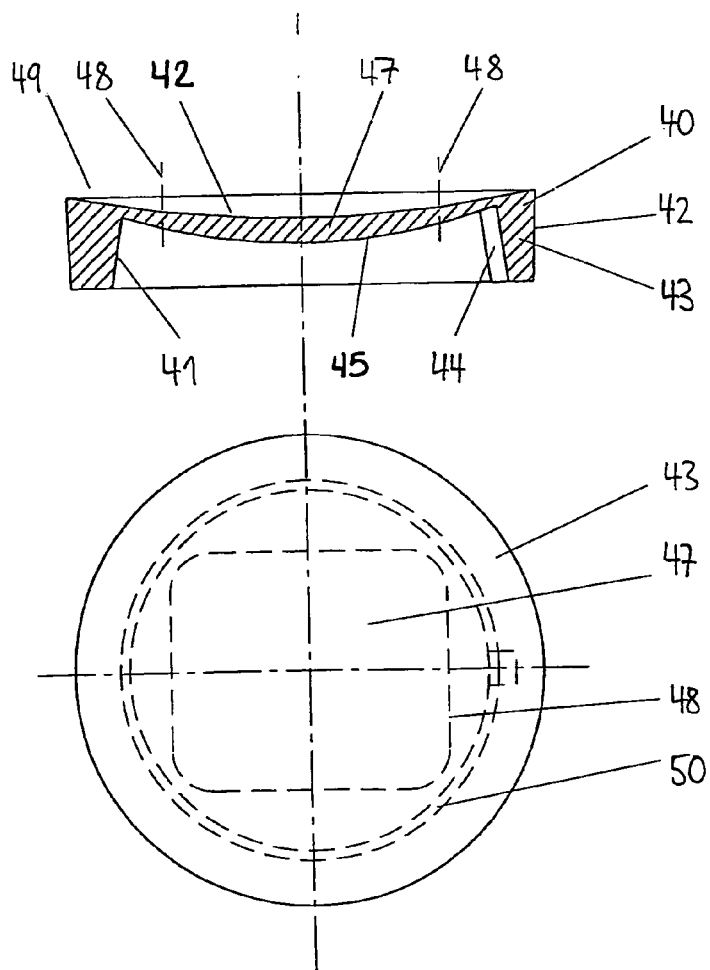
FIG. 14b shows the workpiece after the processing of the convex front face of the lens in a sectional view and in a top view.

FIG. 14b shows the workpiece 49 after the processing of the concave rear face 42 of the lens in a sectional view and in a top view.

The processing of the concave rear face 42 of the lens as completed and provided with an optically active surface. Either lens face is finished, having received a coating and fine engravings which mark the optical axis.

The manufacture also involved a thickness optimization. The actual ophthalmic lens 47 is in the inner region of the workpiece 49, and the geometrical borderline 48 is a confine from the peripheral area 50 which also includes the shaped edge 43.

In the top view, the borderline 48 marks the contour of the finished ophthalmic lens, with a small allowance for the processing by the optician (1 to 2 mm), if necessary. In the example illustrated, the ophthalmic lens 47 is thicker in the center than on the edge (plus lens). In the course of the thickness optimization, the thickness of the edge of the ophthalmic lens 47 was therefore reduced along the borderline 48 so as to correspond approximately to the width of the eyeglass frame.

In a last work step after the application of the coating and the marking of the axis, the ophthalmic lens 47 is separated from the workpiece 49. For this purpose, the processing tool, e. g. a thin end mill cutter, is moved along the borderline 48 for cutting out the ophthalmic lens 47. The processing is carried out in such manner that the contour of the borderline 48 is retained.

It is also contemplated that the workpiece 49, as shown in FIG. 14b, is delivered to the optician who removes the peripheral area 50 and produces the contour along the borderline 48 himself.

The invention is not limited to any of the embodiments described above, but encompasses many variations and modifications. It will be seen, however, that the method for producing ophthalmic lenses 32 according to a general or individual prescription comprises the use of plastic blanks 1 in the form of flat round discs which are clamped on their outer edge. Then the desired final surface geometry and surface quality of the front face 19 and rear face 27 of the lens are made by machining with milling and/or lathe tools and by smoothing and, if applicable, polishing. An annular region 30 of larger thickness 33 is retained on the outer periphery of the workpiece 16 throughout the processing, the annular region 30 serving to clamp and to handle the workpiece 16 during all processing and transport steps. Furthermore, it supports and stabilises the actual ophthalmic lens 32 for further processing operations. Shapes are applied to the annular region 30 which serve to identify the processing axes. The actual ophthalmic lens 32 is provided with fine markings in order to designate the ophthalmic lens 32 as produced. After that, the ophthalmic lens 32 is separated from the annular region 30.

It is provided, moreover, that the method for producing ophthalmic lenses and other shaped bodies with optically active surfaces involves the use of semi-finished parts produced by chipless forming. This is followed by mechanical manufacturing steps. The method involves the use of semi-finished parts 41 whose concave rear lens face 42, which serves as an optically active surface, as well as a shaped edge 43 and, if applicable, a marking 44 are formed integral with the semi-finished part without material removal. The shaped edge 43 protrudes over the concave rear face of the lens 42 in axial direction and is used for clamping operations in material removing machines which produce the desired surface geometry and quality on the front face 45 of the lens. The shaped edge 43 is retained throughout all further processing operations and serves to clamp or to handle the workpiece 49 and also to support the actual ophthalmic lens 47 or shaped body during the further processing. Further processing makes use of the position of the marking 44. Once the processing is completed, the ophthalmic lens 47 is separated from the shaped edge 43.

The method for producing ophthalmic lenses and other shaped bodies involves the use of semi-finished parts which are produced by chipless forming such as casting. This is followed by mechanical manufacturing steps. The method involves the use of semi-finished parts 41 whose convex lens front face 45, which serves as an optically active surface as well as a shaped edge 43 and, if applicable, a marking 44 are formed integral with the semi-finished part 41 without material removal. The shaped edge 43 protrudes over the convex front face 45 of the lens in axial direction and is used for clamping operations in material removing machines which produce the desired surface geometry and quality on the concave rear face of the lens 46. The shaped edge 43 is retained throughout all further processing operations and serves to clamp or to handle the workpiece 49 and also to support the actual ophthalmic lens 47 or shaped body during the further processing. Further processing makes use of the position of the marking 44. Once the processing is completed, the ophthalmic lens 47 is separated from the peripheral area 50 with the corresponding shaped edge 43.

All features and advantages, including design details, spatial arrangements and process steps, which become apparent from the claims, the description and the drawings, may be essential to the invention, both individually and in most variegated combinations.

REFERENCES

1 plastic blank
2 clamping tool
3 first flattening
4 second flattening
5 clamping and centring edge
6 recess
7 edge
8 recess
9 plain milling cutter
10 milling blade
11 tool storage
12 lathe tool
12.1 lathe tool
12.2 lathe tool
12.3 lathe tool
12.4 lathe tool
13 spheroidisation
14 plain milling cutter
15 indexing
16 workpiece
17 plane face
18 clamping tool
19 convex front face of the lens
20 tool spindle
21 workpiece spindle
22 vacuum clamping tool
23 small wall thickness
24 tube connection
25 shaped part
26 globe joint
27 concave rear face of lens
28 clamping element
29 bolt
30 annular region
31 circular groove
32 ophthalmic lens
33 large thickness
34 workpiece spindle
35 larger slot
41 semi-finished part
42 concave rear face of lens
43 shaped edge
44 marking
45 concave front face of lens
47 ophthalmic lens
48 borderline
49 workpiece
50 peripheral area
51 inner chamfer
52 outer chamfer
53 mold
54 front mold part
55 sealing ring
56 rear mold part
57 inner hollow space
58 mold side/mold face
59 mold side/mold face
60 shoulder
61 annular face
62 nose
63 chamfer
64 workpiece holder

The invention claimed is:

1. A method for producing shaped bodies having optically active surfaces according to a general or individual prescription, including the use of plastic blanks in the form of flat, round discs of any surface geometry and including the application of manufacturing techniques with mechanical material removal, characterised in that each plastic blanks (1) used is clamped at an outer edge and a final surface geometry and surface quality of a convex front face (19) and a concave rear face (27) of the shaped body is produced by machining, smoothing and optionally polishing, the shaped body part of a workpiece 16 with an annular region (30) of larger thickness (33) being retained at an outer circumference of the workpiece (16), the annular region (30) serving to clamp or to handle the workpiece (16) during all processing and transport operations, and also with the annular region (30) supporting and mechanically stabilising the shaped body (32) for further processing, in that one or both of markings and shapes are applied to the annular region (30) which serve for the identification of the processing axes, and in that very fine markings are applied to the surface of the shaped body (32) which serve to characterise an axial position of the surface geometries produced, and that subsequently the shaped body (32) is separated from the annular region (30).

2. The method according to claim 1, wherein the plastic blank (1) used has a diameter larger than a diameter of the shaped body (32).

3. The method according to claim 1, wherein the plastic blank (1) used has front and rear faces that comprise either plane surfaces or three-dimensional preformed structures, or a combination thereof.

4. The method according to claim 1, wherein production of the surface geometry is initially performed by one of milling and subsequently, in the fine region, by turning, or one single milling operation or one single turning operation.

5. The method according to claim 1, wherein a plain milling cutter (9) used for the machining work whose diameter vertical to an axis of rotation is larger than a thickness of the cutter (9) in the direction of the axis of rotation, and in that milling blades (10) are circumferentially arranged on the plain milling cutter (9) and have a semicircular shape.

6. The method according to claim 1, wherein lathe tools (12) are used for the machining work which are circumferentially arranged on a tool storage (11) and have one of a circular shape or circular partial regions on small diameter cutting edges.

7. The method according to claim 5, wherein the milling blades (10) of the plain milling cutter (9) are used as lathe tools.

8. The method according to claim 1, wherein first work steps of the machining include one or more of milling work for applying markings and shapes having the form of two flattenings (3) and (4) or of a slot (35) and of an indexing (15) to the edge of the plastic blank (1).

9. The method according to claim 1, wherein the concave rear face (27) of the shaped body (32) is initially produced by milling and turning, followed by smoothing operations and, optionally, by polishing operations, and subsequently, the shaped body (32) is cleaned and provided with a protective lacquer or a protective foil, and that the shaped body (32) is then turned over for processing its convex front face (19) with the work steps used to process the concave rear face (27).

10. The method according to claim 1, wherein a thickness optimization is carried out during production of the convex front face (19) and the concave rear face (27) of the shaped body.

11. The method according to claim 1, wherein the shaped body is produced with prescription lenses, a generation of the geometry on a front face of the prescription lens involves a superposition of different curves and geometries.

12. The method according to claim 1, wherein in the course of a thickness optimization of the shaped body (32), the machining of the convex front lens face (19) involves a production of a circular groove (31) in a peripheral area of the workpiece (16) which confines the annular region (30) outwards while providing an inward transition to the shaped body (32).

13. The method according to claim 6, wherein the the tool storage (11) and its lathe tools (12) is held by a tool spindle (20) which is locked in a B axis during a turning machining step while performing controlled translatory movements along an X axis, whereas a workpiece spindle (21) holding the clamping tool (18) and the workpiece (16) performs phase and speed controlled rotary movements around a C axis and high-dynamical translatory movements along a Z axis.

14. The method according to claim 13, wherein the tool storage (11) with the lathe tool engaging the workpiece (16) performs small rotary movements around a B axis during a feed movement of the tool spindle (20) along an X axis, thus causing a desired angle tracking movement whereby a main axis of the lathe tool is in a desired angular position relative to a surface of the workpiece (16) throughout the whole rotary movement step.

15. The method according to claim 14, wherein the angular position of the main axis of the lathe tool relative to the surface of the workpiece (16) varies during the rotary movement step in a controlled manner by rotary movements around the B axis.

16. The method according to claim 14, wherein during the rotary movement step, the angular position of the main axis of the lathe tool relative to the surface of the workpiece (16) is kept constant by rotational movements around the B axis.

17. The method of claim 1, wherein the shaped body is an ophthalmic lens.

\* \* \* \* \*